United States Patent [19]

Notani et al.

[11] Patent Number: 5,537,402
[45] Date of Patent: Jul. 16, 1996

[54] ATM SWITCH

[75] Inventors: Hiromi Notani; Hideki Ando, both of Hyogo, Japan

[73] Assignee: Mitsubishi Denki Kabushiski Kaisha, Tokyo, Japan

[21] Appl. No.: 362,667

[22] Filed: Dec. 23, 1994

[30] Foreign Application Priority Data

Dec. 28, 1993 [JP] Japan .................................. 5-337030

[51] Int. Cl.⁶ ........................................ H04Q 11/04
[52] U.S. Cl. ................................. 370/60.1; 370/67
[58] Field of Search ....................... 370/60, 60.1, 94.1, 370/94.2, 58.1, 58.2, 58.3, 110.1, 67

[56] References Cited

U.S. PATENT DOCUMENTS

| | | | |
|---|---|---|---|
| 4,910,731 | 3/1990 | Sakurai et al. | 370/67 |
| 5,101,404 | 3/1992 | Kunimoto et al. | 370/60 |
| 5,184,346 | 2/1993 | Kozaki et al. | 370/60 |
| 5,365,519 | 11/1994 | Kozaki et al. | 370/60 |
| 5,394,397 | 2/1995 | Yanagi et al. | 370/60.1 |

*Primary Examiner*—Benedict V. Safourek
*Assistant Examiner*—Ajit Patel
*Attorney, Agent, or Firm*—Lowe, Price, LeBlanc & Becker

[57] ABSTRACT

Each of a plurality of buffer memories provided corresponding to a plurality of OUT line fetches a cell through a corresponding address filter and provides the fetched cell to the corresponding OUT line, in normal operation. When any of the buffer memories become full, a spare buffer memory operates in place of the buffer memory, fetches the cell through a corresponding variable buffer memory, and provides the fetched cell to the corresponding OUT line. Such control is effected by a control circuit. Accordingly, in an ATM switch, increase of hardware related to the storage of information and lowering of efficiency in use can be suppressed as much as possible, and the ratio of disposal of the cells can be reduced.

18 Claims, 31 Drawing Sheets

CLK→TO EACH BLOCK
TRG→TO EACH BLOCK

CLK→TO EACH BLOCK
TRG→TO EACH BLOCK

FIG.20

| E0 | E1 | E2 | E3 | EE | R/W | OPERATION MODE |
|----|----|----|----|----|-----|----------------|
| 1  | 0  | 0  | 0  | 0  | 1   | AQ0:WRITE OPERATION MODE |
| 1  | 0  | 0  | 0  | 0  | 0   | AQ0:READ OPERATION MODE |
| 0  | 1  | 0  | 0  | 0  | 1   | AQ1:WRITE OPERATION MODE |
| 0  | 1  | 0  | 0  | 0  | 0   | AQ1:READ OPERATION MODE |
| 0  | 0  | 1  | 0  | 0  | 1   | AQ2:WRITE OPERATION MODE |
| 0  | 0  | 1  | 0  | 0  | 0   | AQ2:READ OPERATION MODE |
| 0  | 0  | 0  | 1  | 0  | 1   | AQ3:WRITE OPERATION MODE |
| 0  | 0  | 0  | 1  | 0  | 0   | AQ3:READ OPERATION MODE |
| 0  | 0  | 0  | 0  | 1  | 1   | AQE:WRITE OPERATION MODE |
| 0  | 0  | 0  | 0  | 1  | 0   | AQE:READ OPERATION MODE |

FIG.24

| | | 4×4 SW | | | N×N SW | | |
|---|---|---|---|---|---|---|---|
| | | (BIT WIDTH) [bit] | (WORDLENGTH) [word] | (MEMORY CAPACITY) [kbit] | (BIT WIDTH) [bit] | (WORDLENGTH) [word] | (MEMORY CAPACITY) [kbit] |
| COMMON BUFFER MEMORY | | 424 × 512 = 217 | | | 424 × M = 424M | | |
| EMPTY ADDRESS QUEUE | (SPARE No.) | 9 × 512 = 4.6 | | | $(\log_2 M)$ × M = $M \log_2 M$ | | |
| | (REDUCTION RATIO) | (No.) | | | (No.) | | |
| OUTLINE ADDRESS QUEUE + SPARE ADDRESS QUEUE | 1 — 0 | 4 × 9 × 512 = 18.4 | | | N × $(\log_2 M)$ × M = $MN \log_2 M$ | | |
| | 1/2 — 1 | 5 × 9 × 256 = 11.5 | | | (N+1) × $(\log_2 M)$ × $\frac{M}{2}$ = $\frac{M}{2}(N+1)\log_2 M$ | | |
| | 1/L — L-1 | (L+3) × 9 × $\frac{512}{L}$ = $\frac{4.6}{L}(L+3)$ | | | (N+L-1) × $(\log_2 M)$ × $\frac{M}{L}$ = $\frac{M}{L}(N+L-1)\log_2 M$ | | |

FIG.36

| | | MEMORY CAPACITY A (POINTER No.: 512) | MEMORY CAPACITY B (POINTER No.: 512+10%) |
|---|---|---|---|
| | | (BIT WIDTH) (WORDLENGTH) (MEMORY CAPACITY)<br>[bit] [word] [kbit] | (BIT WIDTH) (WORDLENGTH) (MEMORY CAPACITY)<br>[bit] [word] [kbit] |
| CELL + POINTER | COMMON BUFFER MEMORY | (424+9) × 512 = 221.7<br>↑POINTER | (424+10) × 563 = 244.3<br>↑POINTER |
| | EMPTY ADDRESS QUEUE | 9 × 512 = 4.6 | 10 × 563 = 5.6 |
| | TOTAL | 226.3 | 250.0 |
| ADDRESS + POINTER | COMMON BUFFER MEMORY | 424 × 512 = 217.1 | 424 × 512 = 217.1 |
| | EMPTY ADDRESS QUEUE | 9 × 512 = 4.6 | 9 × 512 = 4.6 |
| | OUTLINE ADDRESS QUEUE | (9+9) × 512 = 9.2<br>↑POINTER | (9+10) × 563 = 10.7<br>↑POINTER |
| | EMPTY ADDRESS QUEUE | 9 × 512 = 4.6 | 10 × 563 = 5.6 |
| | TOTAL | 235.5 | 238.0 |

ATM SWITCH

BACKGROUND OF THE INVENTION

1. Field of the Invention

The present invention relates to an apparatus for ATM (Asynchronous Transfer Mode) communication, and specifically to an ATM switch for performing cell exchange in ATM communication.

2. Description of the Background Art

Recently, ISDN (Integrated Services Digital Network) providing various communication services such as telephone, data communication, circuit exchange and packet switching in an integrated manner has been practically used. Broadband ISDN has been studied to improve the speed of communication in the ISDN and to provide wider variety of communication services to be handled in the future.

In the broadband ISDN, an interface having more than one hundred times the transmission capacity of existing ISDN is used. The network is integrated in accordance with a new communication method called ATM (Asynchronous Transfer Mode).

The ATM is adapted for multimedia, and any terminal can be connected to the network regardless of the speed of communication and the required quality. In the ATM, every information from various terminals is treated in fixed length blocks, no matter whether the communication media is voice, image, data or the like. The block is referred to as a cell. The cell includes a header portion and a data portion. In the header portion, destination identifying information or the like is stored. By using this destination identifying information, every information is transmitted and switched in a multiplexed manner at high speed, cell by cell.

The ATM switch has a function of a core in an exchange for providing a cell, from an IN line (input port) to a desired OUT line (output port) based on the destination information in the header attached to the cell. If there are a number of such ATM switches in the exchange, each ATM switch is referred to as a unit switch.

A specific example of a conventional ATM switch will be described.

A representative example of a conventional ATM switch includes output buffer type ones and common buffer type ones. These ATM switches include a buffer memory for temporarily storing the input cell. The output buffer type ATM switch has a plurality of buffer memories provided for respective OUT lines. The common buffer type ATM switch includes one buffer memory provided in common for all the OUT lines.

FIG. 37 is a block diagram showing a conventional output buffer type ATM switch. The ATM switch includes a multiplexer 1, address filters F0, F1, F2 and F3, and buffer memories M0, M1, M2 and M3.

Multiplexer 1 receives cells input from IN lines I0, I1, I2 and I3, respectively. Address filters F0 to F3 are provided corresponding to OUT lines O0, O1, O2 and O3, respectively. Buffer memories M0 to M3 are also provided for OUT lines O0 to O3, respectively. Each of the buffer memories M0 to M3 is an FIFO memory.

The operation of the ATM switch shown in FIG. 37 will be described. Cells are input from IN lines I0 to I3, respectively, to multiplexer 1. Multiplexer 1 time-divisionally multiplexes and outputs the input cells. Address filters F0 to F3 each fetch only the cell having destination information of the corresponding OUT line, of the cells output from multiplexer 1. Address filters F0 to F3 apply the fetched cells to corresponding buffer memories M0 to M3, respectively. Buffer memories M0 to M3 write, in the order of arrival, the cells applied from corresponding address filters F0 to F3 and successively read the written cells to the corresponding OUT lines O0 to O3, respectively. In the output buffer type ATM switch as described above, buffer memories M0 to M3 are provided for OUT lines O0 to O3, respectively. Therefore, there is not a blocking caused between the OUT lines, achieving high throughput. Further, since buffer memories M0 to M3 can be implemented by the FIFO memories, control is easy.

The conventional common buffer type ATM switch will be described.

FIG. 38 is a block diagram showing a conventional common buffer type ATM switch. The ATM switch includes a multiplexer 1, a buffer memory M, a demultiplexer 2, a header extracting circuit 3, an empty address queue 4, address queues AQ0, AQ1, AQ2 and AQ3, a write data bus WB, a read data bus RB and a control circuit C7.

Multiplexer 1 receives cells input through IN lines I0 to I3. Common buffer memory M is provided commonly for all OUT lines O0 to O3. A cell output from multiplexer 1 is written to the common buffer memory M. Demultiplexer 2 provides cells read from common buffer memory M to OUT lines O0 to O3.

Header extracting circuit 3 is connected between each of the IN lines I0 to I3 and control circuit C7. Control circuit C7 is connected also to common buffer memory M and empty address queue 4 in addition to header extracting circuit 3, and further to address queues AQ0 to AQ3 through write data bus WB and read data bus RB, respectively.

The operation of the ATM switch shown in FIG. 38 will be described.

Cells are input from IN lines I0 to I3 to multiplexer 1, respectively. Multiplexer 1 time-divisionally multiplexes the input cell and applies the same to common buffer memory M. Header extracting circuit 3 extracts the information at the head header portion of the cell which is input to multiplexer 1, and applies the extracted information of the header portion to control circuit C7. Based on the applied information of the header portion, control circuit C7 controls writing and reading of common buffer memory M in the following manner. In empty address queue 4, an empty address of the common buffer memory M at present is written.

The aforementioned write control will be described. At the time of writing, in control circuit C7, when the extracted information of the header portion is applied, the empty address information is read from empty address queue 4. Then, the read empty address is applied as write address WA to common buffer memory M.

At the same time, control circuit C7 controls operation such that write address WA is written through write data bus WB to an address queue which corresponds to the destination OUT line indicated by the extracted header information, among the OUT line address queues AQ0 to AQ3.

In this manner, at the time of writing, cell is written to the empty address of common buffer memory M, and write address WA is written to the address queue which corresponds to the extracted information of the header portion.

Read control will be described. At the time of reading, control circuit C7 selects OUT line address queues AQ0 to AQ3 in a prescribed order, and successively reads the addresses from address queues AQ0 to AQ3 through read data bus RB. Then, control circuit C7 provides the read address as read address RA to common buffer memory M. At the same time, control circuit C7 writes read address as an empty address to empty address queue 4.

Common buffer memory M reads the cell stored at the applied read address RA and applies the cell to the demultiplexer 2. Demultiplexer 2 outputs the applied cell to the corresponding one of OUT lines O0 to O3.

In this manner, at the time of reading, cell is read from the common buffer memory in accordance with the read address RA read from OUT line address queues AQ0 to AQ3.

However, the above described conventional ATM switch suffers from the following problems.

First, disadvantage in the output buffer type ATM switch will be described. In the output buffer type ATM switch, when the destination of cells input from IN lines I0 to I3 concentrate on a specific OUT line, the capacity of the buffer memory corresponding to the OUT line may be used up, resulting in disposal of the cells. Here, the disposal of a cell means that the cell which is input to the ATM switch is not written in the buffer memory but discarded.

A possible method of avoiding such disposal of cells is to increase capacity of each buffer memory. However, this leads to increase in hardware amount of the ATM switch.

The disadvantage of the common buffer type ATM switch will be described. In the common buffer type ATM switch, when the destinations of cells input from IN lines concentrate on a specific OUT line, the remaining capacity of the OUT line address queue corresponding to the OUT line may be used up, resulting in disposal of the cells.

One possible method of avoiding such disposal of cells is to make the depth of each OUT line address queue equal to the number of addresses of the buffer memory. However, this method results in increase in hardware amount of the OUT line address queue.

SUMMARY OF THE INVENTION

An object of the present invention is to decrease ratio of disposal of cells in the ATM switch.

Another object of the present invention is to provide ATM switch enabling reduction in disposal ratio of cells while not degrading efficiency and increasing scale of hardware with respect to storage of information.

According to the present invention, the ATM switch for selectively outputting a plurality of cells having individual destination information and input from a plurality of IN lines to a plurality of OUT lines in accordance with the destination information of each cell includes a multiplexing and outputting circuit, a plurality of first filter circuits, a plurality of first memory circuits, a second filter circuit, a second memory circuit, a plurality of selecting circuits, a filter control circuit and a selection control circuit.

The multiplexing and outputting circuit time-divisionally multiplexes and outputs the plurality of cells input from the plurality of IN lines. The plurality of first filter circuits are provided corresponding to the plurality of OUT lines, respectively, and each fetch cells having destination information of the corresponding OUT lines, from the cells output from the multiplexing and outputting circuit.

The plurality of first memory circuits are provided corresponding to the plurality of first filter circuits, respectively, and each writes the cell fetched by the corresponding one of the first filter circuits and reads the written cell.

The second filter circuit is capable of changing setting of destination information of the cell to be fetched, and fetches the cell having the set destination information out of the cells output from the multiplexing and outputting circuit. The second memory circuit writes the cell fetched by the second filter circuit and reads the written cell.

The plurality of selecting circuits are provided corresponding to the plurality of OUT lines, each of which selects either the first or second memory circuit corresponding to the respective OUT line and outputs the cell written in the selected memory circuit to the corresponding OUT line.

The filter control circuit controls the set state of the cell to be fetched in the second filter circuit, in accordance with the state of use of each of the plurality of first memory circuits. The selected control circuit controls the state of selection of respective selecting circuits in accordance with the state of use of each of the plurality of first memory circuits.

Thus, in an operation state in which each of the first memory circuits has a margin for writing cells, the selection control circuit controls the selecting circuit such that each of the selecting circuits select the corresponding one of the first memory circuits.

Therefore, when cells having specific OUT line as their destination are not concentrated as inputs, the cells output from the multiplying and outputting circuit are output to the destination OUT lines through the first filter circuits, the first memory circuits and the selecting circuits corresponding to the destination OUT lines of the cells.

The filter control circuit controls the set state of the second filter circuit in an operation state where any of the first memory circuits does not have any further margin for writing the cell, such that the second filter circuit fetches that cell of which destination is the OUT line corresponding to said first memory circuit.

In this case, the selection control circuit controls the state of selection of the selecting means corresponding to said first memory circuit which no longer has any margin for writing the cell, such that the second memory circuit is selected after all the cells written in said first memory circuit are read.

Accordingly, the second filter circuit and the second memory circuit operate in place of the first memory circuit which does not have any margin for writing the cell and the corresponding first filter circuit. Therefore, cells having specific OUT line as their destinations are concentrated as inputs, the cell output from the multiplying and outputting circuit is provided to the destination OUT line through the second filter circuit, the second memory circuit and the selecting circuit, with respect to the specific OUT line.

As described above, in the event that any of the first memory circuits comes to have no more margin for writing the cells, the cell having the OUT line corresponding to that said memory circuit as its destination is written to the second memory circuit through the second filter circuit. Therefore, the ratio of disposal when cells having specific OUT lines as their destination are input concentrated, can be reduced.

Since the ratio of disposal of the cells can be reduced by the provision of the second memory circuit, it becomes unnecessary to enlarge capacity of each of the first memory circuits in order to reduce the ratio of disposal of the cells. Therefore, increase in scale of the hardware can be suppressed as much as possible. Accordingly, decrease in efficiency in using the hardware can be suppressed.

According to another aspect of the present invention, the ATM switch for selectively outputting a plurality of cells having individual destination information and input through a plurality of IN lines to a plurality of OUT lines in accordance with the destination information of each cell includes a multiplying and outputting circuit, a plurality of first filter circuits, a second filter circuit, a first memory circuit, a plurality of selecting circuits, a plurality of second memory circuits, a filter control circuit and a selection control circuit.

The multiplying and outputting circuit time-divisionally multiplies and outputs a plurality of cells which are input through a plurality of IN lines.

The plurality of first filter circuits are provided corresponding to respective ones of the plurality of OUT lines, and each fetches a cell having destination information of the corresponding OUT line, from the cells provided from the multiplying and outputting circuit.

The setting of destination information of the cell to be fetched can be changed in the second filter circuit, and the second filter circuit fetches the cell having the set destination information, from the cells output from the multiplying and outputting circuit.

The first memory circuit writes the cell fetched by the second filter circuit, and reads the written cell.

The plurality of selecting circuits are provided corresponding to the plurality of OUT lines, each receives the cell fetched by the first filter circuit corresponding to the respective OUT lines and the cell read from the first memory circuit, and selectively outputs either of the cells.

The plurality of second memory circuits are provided corresponding to the plurality of OUT lines, each write the cell output from the corresponding selecting circuit, and reads the written cell to the corresponding OUT line.

The filter control circuit controls the set state of the cell to be fetched in the second filter circuit, in accordance with the state of use of each of the plurality of second memory circuits.

The selection control circuit controls the state of selection of the selecting circuits in accordance with the state of use of each of the plurality of second memory circuits.

Therefore, in an operation state in which each of the second memory circuits has a margin for writing a cell, the selection control circuit controls the selection circuits such that each of the selecting circuits selects the corresponding first filter circuit.

Therefore, when cells having a specific OUT line as their destination are not concentrated, the cell output from the multiplying and outputting circuit is output to the first destination OUT line through the first filter circuit, the selecting circuit and the second memory circuit which correspond to the destination OUT line.

The filter control circuit controls in an operation state in which any of the second memory circuit is full and has no margin for writing a further cell, the set state of the second filter circuit such that the second filter circuit fetches the cell of which destination is that OUT line which corresponds to the said second memory circuit.

In this case, the selection control circuit controls the state of selection of the selecting circuit corresponding to the second memory circuit which lost the margin for writing the cell such that this selecting circuit outputs the cell from the first memory circuit.

Accordingly, the second filter circuit and the first memory circuit operate. Therefore, when cells having a specific OUT line as their destination is input concentratedly, the cell output from the multiplying and outputting circuit is provided to the destination OUT line through the second filter circuit, the first memory circuit, the selecting circuit and the second memory circuit, with respect to the aforementioned specific OUT line.

As described above, in the event that any of the second memory circuit has lost its margin for writing further cell, reading of the cell from that second memory circuit only is performed, the cell having the OUT line corresponding to the second memory circuit as its destination is written to a first memory circuit through the second filter circuit, and then it is applied to the second memory circuit in which reading of the cell only is performed. Therefore, the ratio of disposal of the cells when cells having specific OUT line as their destination are concentrated, can be reduced. Further, the first memory circuit can be quickly returned to the standby state.

Since the ratio of disposal of the cells can be reduced by the provision of the first memory circuits, it is not necessary to increase the capacity of each of the second memory circuits in order to reduce the ratio of disposal of the cells. Accordingly, increase in hardware can be suppressed as much as possible, and hence lowering of efficiency in using the hardware can also be suppressed.

According to another aspect of the present invention, an ATM switch for selectively outputting a plurality of cells each having individual destination information and input through a plurality of IN lines to a plurality of OUT lines in accordance with the destination information of each cell includes a multiplying and outputting circuit, a plurality of filter circuits, a plurality of memory circuits, a filter control circuit, a selecting circuit and a selection control circuit.

The multiplying and outputting circuit time-divisionally multiplies and outputs the plurality of cells input through the plurality of IN lines.

The plurality of filter circuits are larger in number than the OUT lines, the setting of destination information with respect to the cell to be fetched can be changed, and the filter circuits fetch the cell having the set destination information from the cells output from the multiplying and outputting circuit.

The plurality of memory circuits are provided corresponding to the plurality of filter circuits, each of which writes the cell fetched by the corresponding filter circuit and reads the written cell.

The filter control circuit controls the set state of the cell to be fetched in each of the plurality of filter circuits, in accordance with the state of use of each of the plurality of memory circuits.

The selecting circuit selects a part of a plurality of memory circuits, and let the cells read from the selected memory circuits, to an OUT line corresponding to the destination information set in the filter circuit corresponding to the selected memory circuit.

The selection control circuit controls the state of selection of the selecting circuit in accordance with the state of use of each of the plurality of memory circuits.

In this manner, the filter control circuit controls the set state of the cell to be fetched of the filter circuit such that one filter circuit and one memory circuit correspond to each OUT line.

In an operation state in which each of the memory circuits has margin for writing a cell, the selecting circuit is controlled such that the selecting circuit selects the memory circuit corresponding to respective OUT lines in accordance with the correspondence between the filter control circuit and the OUT lines.

Therefore, when cells having a specific OUT line as their destination are not concentrated, the cell output from the multiplying and outputting circuit is output to the destination OUT line through the filter circuit, the memory circuit and the selecting circuit which correspond first to the destination OUT line of the cell.

In an operation state in which any of memory circuits corresponding to an OUT line has lost its margin for writing a cell, the filter control circuit controls the set state of a filter circuit such that said filter circuit not associated with the OUT line fetches that cell of which destination is the specific OUT line which corresponds to said memory circuit that has lost the margin, instead of the filter circuit corresponding to said memory circuit.

In this case, the selection control circuit controls the selecting circuit such that the selecting circuit selects, after the cells which have been written in the memory cell which has lost its margin for writing the cell are all read, a memory circuit corresponding to the filter circuit which is newly associated with the specific OUT line, as the memory circuit corresponding to the OUT line.

Thus, a new filter circuit and a new memory circuit operate. Therefore, when cells having a specific OUT line as their destination are input concentratedly, the cell output from the multiplying and outputting circuits is output to the destination OUT line through a filter circuit, a memory circuit and a selecting circuit other than the first selected filter circuit and the memory circuit.

As described above, in any of the memory circuits corresponding to the OUT lines, the number of memory circuits being larger than number of OUT lines, comes to have no margin for writing a cell, a cell having the OUT line corresponding to the memory circuit as its destination is written to another memory circuit which is not corresponding to the OUT line. Therefore, the ratio of disposal of the cells when cells having a specific OUT line as their destination are concentrated can be reduced.

Though memory circuits are provided in larger number than the number of OUT lines, increase in the scale of hardware can be suppressed if the capacity of each memory circuit is reduced as the number of memory circuits is increased. Accordingly, lowering of the efficiency in using the hardware can be suppressed as much as possible.

According to a still another aspect of the present invention, the ATM switch for selectively outputting a plurality of cells each having individual destination information and input through a plurality of IN lines, to a plurality of OUT lines in accordance with the destination information of each cell, includes a multiplying and outputting circuit, a memory circuit, a selection output circuit, a plurality of first address storing circuits, a second address storing circuit, a destination information extracting circuit, a corresponding OUT line control circuit and a memory control circuit.

The multiplying outputting circuit time-divisionally multiplies and outputs a plurality of cells input through a plurality of IN lines.

The memory circuit writes a cell output from the multiplying and outputting circuit to an empty address, and reads the written cell.

The selection output circuit outputs the cell read from the memory circuit to an OUT line corresponding to the destination information of the cell.

The plurality of first address storing circuits are provided corresponding to the plurality of OUT lines, and each of which stores an address of the memory circuit in which a cell having destination information of the corresponding OUT line, and reads the stored address.

The second address storing circuit is adapted such that the setting of the corresponding OUT line can be changed, and it stores the address of the memory circuit in which the cell having the destination information of the corresponding OUT line and reads the stored address.

The destination information extracting circuit extracts the destination information of the cell input from each of the plurality of IN lines. The corresponding OUT line control circuit controls the setting of the OUT line to which the second address storing circuit corresponds, in accordance with the state of use of each of the plurality of first address storing circuits.

The memory control circuit controls the operation such that an input cell is written to an empty address of the memory circuit, the address of the memory circuit in which the cell has been written is stored in the first or second address storing means which corresponds to the destination information of the cell extracted by the destination information extracting means, the address stored in the first or second address storing means is read, and the cell stored in that address of the memory circuit is read.

In this manner, when each of the first address storing circuit has a margin for storing the address, the memory control circuit has the first address storing circuit store the write address of the cell corresponding to the OUT line, based on the destination information extracted by the destination information extracting circuit.

Therefore, when cells having a specific OUT line as their destination are not input concentratedly, the first address storing circuit is used. In the event that any of the first address storing circuits comes to have no margin for storing the address, the corresponding OUT line control circuit uses an OUT line which corresponds to the second address storing means, as the OUT line which corresponds to the first address storing circuit that has lost its margin for storage. The memory control circuit stores the address in the second address storing means, based on the destination information extracted by the destination information extracting circuit.

The address stored in the first or second address storing circuit is read by the memory control circuit. Memory control circuit reads the cell corresponding to the address, from the memory circuit. The read cell is output to the corresponding OUT line through the selection and output circuit.

As described above, when any of the first address storing circuits comes to have no more margin for storing the address, the address of the cell having the OUT line corresponding to the said first address storing circuit as its destination is stored in the second address storing circuit. Therefore, the ratio of disposal of the cells when cells having a specific OUT line as their destination are input concentratedly can be reduced.

Since the ratio of disposal of the cells can be reduced by the provision of the second address storing circuit, it is not necessary to increase the capacity of each of the first address storing circuits to reduce the ratio of disposal of the cells, and hence increase in scale of the hardware can be suppressed as much as possible. Further, lowering of the efficiency in using the hardware can also be suppressed.

According to a still another aspect of the present invention, the ATM switch for selectively outputting a plurality of cells inputting each having destination information and input through a plurality of IN lines to a plurality of OUT lines in accordance with the destination information of each cell includes a multiplying and outputting circuit, a memory circuit, a selection and output circuit, an address storing circuit, a destination information extracting circuit and a memory control circuit.

The multiplying and outputting circuit time-divisionally multiplies and outputs the plurality of cells input through the plurality of IN lines. The memory circuit writes the cell output from the multiplying and outputting circuit to an empty address and reads the read cell.

The selecting and output circuit outputs the cell read from the memory means output to the OUT line corresponding to the destination information of the cell.

Destination information extracting means extracts destination information of the cell input from each of the plurality of IN lines. The address storing circuit stores an address of the memory circuit in which the cell is written, and a pointer set corresponding to the address for specifying the address of a next cell having the destination information of the same OUT line, and generates in a chain, a plurality of pointer chains corresponding to respective ones of the plurality of OUT lines, by means of the pointer.

The memory control circuit controls the operation such that the input cell is written in an empty address of the memory circuit, and the address to which the cell is written is stored in the address storing circuit so as to provide a pointer chain corresponding to the destination information of the cell extracted by the destination information extracting means, and respective addresses of the pointer chain are read from the address storing means, so that the cell stored in that address of the memory circuit is read.

In this manner, the destination information extracting means extracts the destination information of the cell. The memory control circuit controls the operation such that the cell output from the multiplying and outputting circuit is written to the empty address of the memory circuit. The memory control circuit also controls the operation such that the address in which the cell is written is stored in the address storing circuit so as to provide a pointer chain corresponding to the extracted destination information.

Further, the memory control circuit reads the address from the address storing circuit for every pointer chain so that the cell corresponding to the address is read from the memory circuit. The read cell is output to the corresponding OUT line through the selection and output circuit.

As described above, in one address storing circuit, the address is stored to form a pointer chain corresponding to the destination information of the cell.

Therefore, within the capacity of one address storing circuit, the number of addresses which can be stored can be increased/decreased in every pointer chain. Therefore, the ratio of disposal of the cells can be reduced when cells having a specific OUT line as their destination are input concentratedly.

Further, since the address is stored by forming a pointer chain in the address storing circuit, increase in scale of the hardware can be suppressed as much as possible and hence the lowering of efficiency in using the hardware can also be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 shows relation between states of an enable signal and a read/write control signal and operation modes.

FIG. 24 shows, in a table, memory capacity of a unit switch in accordance with the fifth embodiment.

FIG. 36 shows, in a table, comparison between memory capacity of a unit switch in accordance with the ninth embodiment and the memory capacity of a conventional unit switch.

DESCRIPTION OF THE PREFERRED EMBODIMENTS

Embodiments of the present invention will be described in detail with reference to the figures.

First Embodiment

Figure 1:
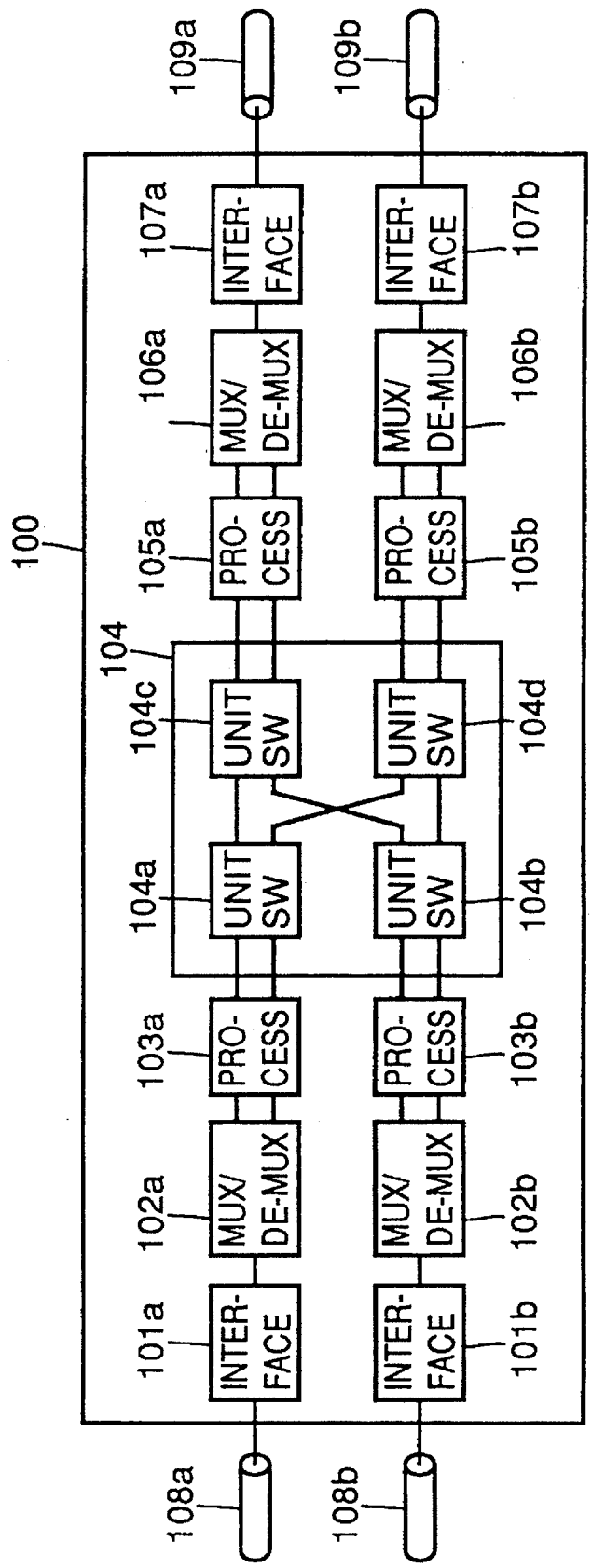
FIG. 1 is a block diagram showing a schematic structure of an ATM exchange.

The first embodiment will be described. FIG. 1 is a block diagram showing a schematic structure of the ATM exchange to which the present invention is applied.

Referring to FIG. 1, ATM exchange 100 includes optical interface portions 101a, 101b, 107a and 107b, multiplexer/demultiplexer portions 102a, 102b, 106a and 106b, interface processing portions 103a, 103b, 105a and 105b, and an ATM switch 104. ATM switch 104 includes a plurality of unit switches 104a to 104d.

A plurality of optical fiber cables 108a, 108b, 109a and 109b are connected to the ATM exchange 100.

Respective components of ATM exchange 100 correspond to the optical fiber cables 108a to 109b in the following manner. Optical interface portion 10a, multiplexer/demultiplexer portion 102a, interface processing portion 103a and unit switch 104a correspond to optical fiber cable 108a. Optical interface portion 101b, multiplexer/demultiplexer portion 102b, interface processing portion 103b and unit switch 104b correspond to optical fiber cable 108b.

Unit switch 104c, interface processing portion 105a, multiplexer/demultiplexer portion 106a and optical interface portion 107a correspond to optical fiber cable 109a. Unit switch 104d, interface processing portion 105b, multiplexer/demultiplexer portion 106b and optical interface portion 107b correspond to optical fiber cable 109b.

The exchange 100 switches connection of communication path between optical fiber cables 108a and 108b and optical fiber cables 109a and 109b.

In this embodiment, communication in the direction from optical fiber cables 108a and 108b to optical fiber cables 109a and 109b will be described.

The operation of ATM exchange 100 will be described. A plurality of cells are successively input from optical fiber cables 108a and 108b, respectively, to ATM exchange 100. Each cell consists of a header portion and a data portion, and the header portion has cell destination information.

The optical signal input from optical fiber cable 108a is converted to an electric signal at optical interface portion 101a. The cell converted to the electric signal is time-divisionally multiplexed/demultiplexed by multiplexer/demultiplexer portion 102a. The time-divisionally multiplexed/demultiplexed cell is subjected to a prescribed interface processing such as frame processing by the interface processing portion 103a, and then it is applied to ATM switch 104.

In ATM switch 104, the cell input from interface processing portion 103a is received by unit switch 104a. Unit switch 104a applies the input cell to the unit switch 104c or 104d corresponding to the destination optical fiber cable 109a or 109b.

Optical interface portion 101b, multiplexer/demultiplexer portion 102b, interface processing portion 103b and unit switch 104b perform similar operation as those corresponding to optical fiber cable 108a, respectively.

Unit switch 104c or 104d which has received the cell applies the cell to the corresponding interface processing portion 105a or 105b. Interface processing portion 105a perform interface processing reverse to that of interface processing portion 103a on the received cell, and applies the processed cell to multiplexer/demultiplexer portion 106a. Multiplexer/demultiplexer portion 106a perform time divisional multiplexing/demultiplexing process reverse to that of multiplexer/demultiplexer portion 102a, and applies the process cell to optical interface portion 107a. Optical interface portion 107a performs a process reverse to that of optical interface portion 101a, so that the electric signal is converted to an optical signal. The cell converted to that optical signal here is applied to optical fiber cable 109a.

Unit switch 104d, interface processing portion 105b, multiplexer/demultiplexer portion 106b and optical interface portion 107b corresponding to optical fiber cable 109b perform similar operations as those corresponding to optical fiber cable 109a.

Therefore, in ATM exchange 100, cells input from optical fiber cables 108a and 108b, respectively, are output from optical fiber cables 109a and 109b corresponding to the destination information of the cells.

Though four optical fiber cables are connected to ATM exchange 100 of FIG. 1 for simplicity of description, four or more optical fiber cables can be connected to ATM exchange 100 by providing optical interface portion, multiplexer/demultiplexer portion, interface processing portion and unit switch for each of the connected optical fiber cable.

Figure 2:
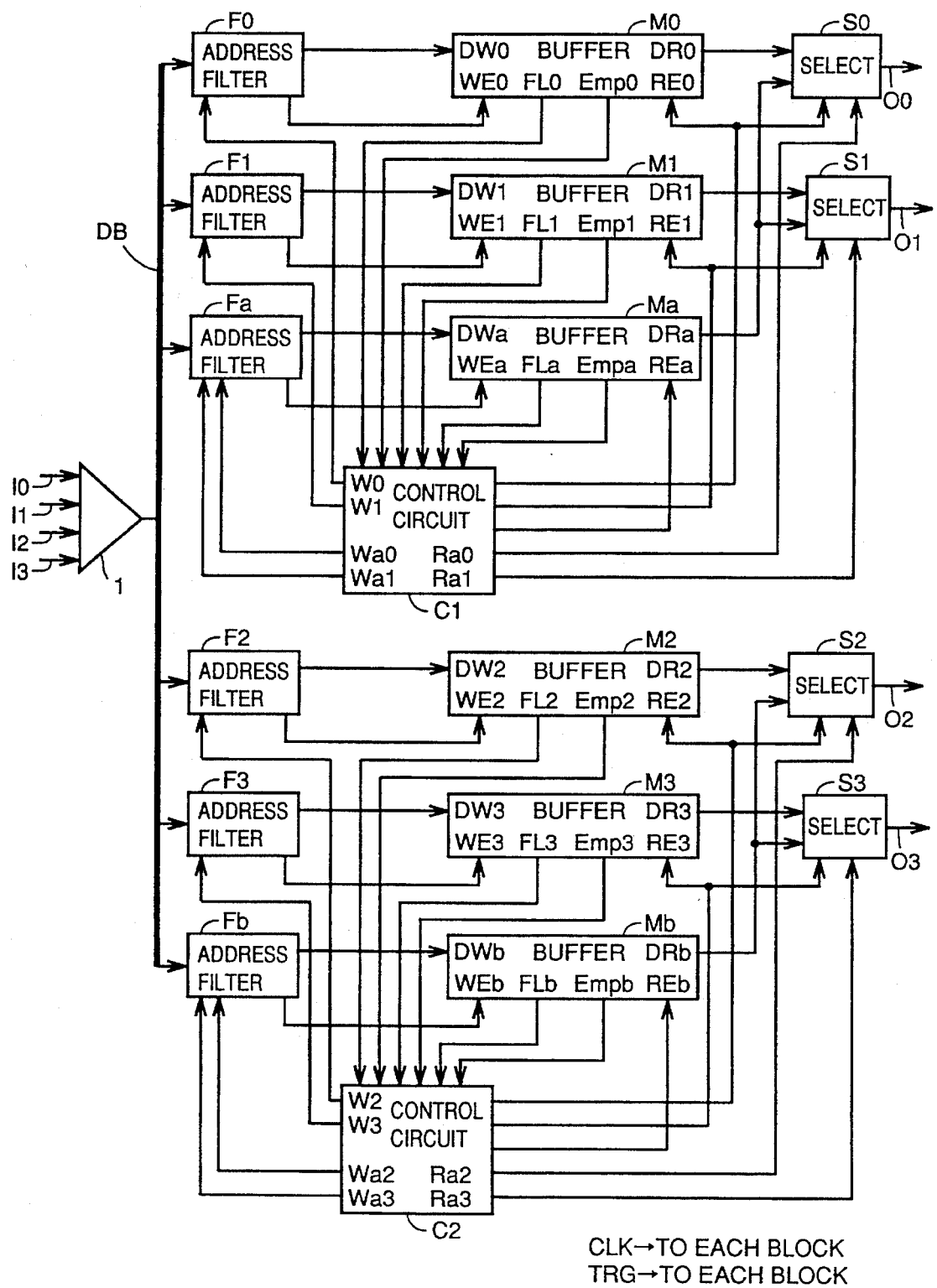
FIG. 2 is a block diagram showing a structure of a unit switch in accordance with a first embodiment.

Unit switches 104a to 104d will be described in detail. These unit switches has identical structure. FIG. 2 is a block diagram showing a structure of one of the unit switches 104a to 104d.

Referring to FIG. 2, the unit switch has four IN lines I0 to I3 and four OUT lines O0 to O3.

The unit switch includes a multiplexer 1, a data bus DB, address filters F0 to F3, variable address filters Fa, Fb, buffer memories M0 to M3, spare buffer memories MA, MB, selectors S0 to S3 and control circuits C1 and C2. Address filter F0, buffer memory M0 and selector S0 correspond to OUT line O0. Address filter F1, buffer memory M1 and selector S1 correspond to OUT line O1. Address filter F2, buffer memory M2 and selector S2 correspond to OUT line O2. Address filter F3, buffer memory M3 and selector S3 correspond to OUT line O3.

In these unit switches, cells are input from IN lines I0 to I3, respectively, and these cells are output from OUT lines O0 to O3 corresponding to the destination information of respective cells.

Cells are input to multiplexer 1 from respective ones of I0 to I3. Multiplexer 1 time-divisionally multiplexes and outputs the input cells. Output from multiplexer 1 are applied to address filters F0 to F3 and variable address filters Fa and Fb through data bus DB, respectively. A cell having destination information of O3 as its destination. Address filter F0 applies write data DW0 and a write enable signal WE0 to buffer memory M0.

Write data DW0 is the cell extracted by address filter F0, that is, the cell which is to be written to buffer memory M0. Buffer memory M0 receives, in addition to write data DW0 and the write enable signal WE0, a read enable signal RE0 from control circuit C1. Buffer memory M0 applies a full signal FL) and an empty signal Emp0 to control circuit C1, and applies read data DR0 to selector S0.

The full signal FL0 indicates that buffer memory M0 is full. Empty signal Emp0 indicates that buffer memory M0 is empty. Read data DW0 indicates a cell read from buffer memory M0.

Address filter F1 receives cells from data bus DB and a write control signal W1 from control circuit C1. Address filter F1 extracts only the cell having destination information specifying the OUT line O1 as its destination. Address filter F1 applies write data DW1 and write enable signal WE1 to buffer memory M1.

Write data DW1 indicates the cell extracted by address filter F1, that is, the cell to be written to buffer memory M1.

Buffer memory M1 receives, in addition to write data DW1 and write enable signal WE1, a read enable signal RE1 from control circuit C1. Buffer memory M1 applies a full signal FL1 and an empty signal Emp1 to control circuit C1, and applies read data DR1 to selector S1.

Full signal FL1 is a signal indicating that buffer memory M1 is full. Empty signal Emp1 indicates that buffer memory M1 is empty. Read data DR1 indicates the cell read from buffer memory M1.

Variable address filter Fa receives cells from data bus DB and write control signals Wa0 and Wa1 from control circuit C1. Variable address filter Fa selectively extracts one of the cells having destination information specifying OUT line O0 as its destination and a cell having destination information specifying OUT line O1 as its destination, in response to write control signals Wa0 and Wa1.

Variable address filter Fa applies write data DWa and a write enable signal WEa to a spare buffer memory Ma. Write data DWa indicates the cell extracted by variable address filter Fa, that is, the cell which is to be written to spare buffer memory Ma.

Spare buffer memory Ma receives, in addition to write data DWa and write enable signal WEa, a read enable signal REa from control circuit C1. Spare buffer memory Ma applies a full signal FLa and an empty signal Empa to control circuit C1, and applies read data DRa to selectors S0 and S1.

The signal FLa indicates that spare buffer memory Ma is full. Empty signal Empa indicates that spare buffer memory Ma is empty. Read data DRa reads the cell read from spare buffer memory Ma.

Selector S0 receives, in addition to the aforementioned signals, a read control signal Ra0. Selector S0 outputs, in response to read enable signal RE0 and read control signal Ra0, one of the read data DR0 and DRa, selectively to the OUT line O0. Selector S1 receives, in addition to the aforementioned signals, a read control signal Ra1 from control circuit C1. Selector S1 outputs, in response to read enable signal RE1 and read control signal Ra1, one of read data DR1 and DRa selectively to OUT line O1.

In this manner, spare buffer memory Ma is provided as a spare for both buffer memories M0 and M1. Control circuit C1 controls operations of address filters F0, F1, variable address filter Fa, buffer memories M0, M1, spare buffer memory Ma and selectors S0 and S1.

Address filters F2, F3, variable address filter Fb, buffer memories M2, M3, spare buffer memory Mb and selectors S2 and S3 are structured in the similar manner as the above described address filters F0, F1, variable address filter Fa, buffer memories M0, M1, spare buffer memory Ma and selectors S0, S1.

In other words, spare buffer memory Mb is provided as a spare for both buffer memories M2 and M3. Control circuit C2 controls operations of address filters F2, F3, variable address filter Fb, buffer memories M2, M3, spare buffer memory Mb and selectors S2 and S3.

In each of the circuits in the unit switch shown in FIG. 2, a clock signal CLK and a trigger signal TRG are applied.

Various circuits constituting the unit switch shown in FIG. 2 will be described in detail.

First, control circuits C1 and C2 of FIG. 2 will be described. Control circuits C1 and C2 have the same structure. Therefore, one control circuit C1 will be described as a representative.

Figure 3:
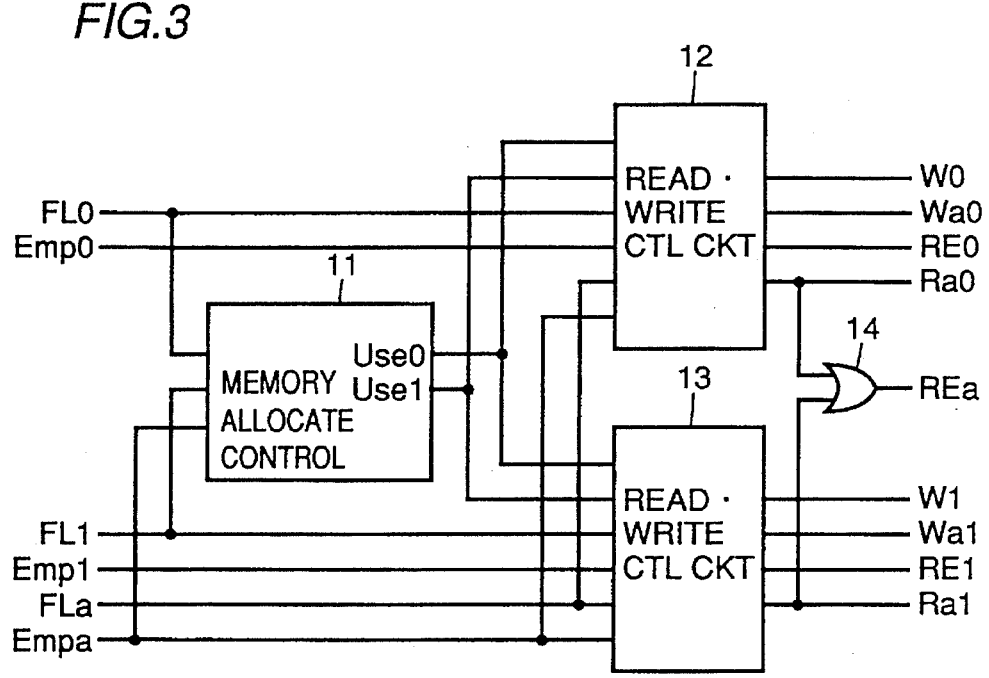
FIG. 3 is a block diagram showing a structure of a control circuit shown in FIG. 2.

FIG. 3 is a block diagram showing a structure of the control circuit C1. Referring to FIG. 3, this control circuit includes a spare memory allocation control circuit 11, read-write control circuits 12 and 13, and an OR gate 14.

Spare memory allocation control circuit 11 receives full signals FL0 and FL1 as well as an empty signal Empa. Spare memory allocation control circuit 11 provides allocation control signals Use0 and Use1 in response to these input signals. Read.write control circuit 12 receives allocation control signals Use0, Use1, full signals FL0, FLa and empty signals Emp0 and Empa. Read.write control circuit 12 provides write control signals W0, Wa0, a read enable signal RE0 and a read control signal Ra0, in response to these input signals.

Read.write control circuit 13 receives allocation control signals Use0, Use1, full signals FL1 and FLa and empty signals Emp1 and Empa. Read.write control circuit 13 provides write control signals W1, Wa1, a read enable signal RE1 and a read control signal Ra1, in response to these input signals.

OR gate 14 receives read control signals Ra0 and Ra1. It provides a read enable signal REa in response to these input signals.

In such a control circuit, spare memory allocation control circuit 11 controls allotment of spare buffer memory Ma to the OUT line. Read.write control circuit 12 controls writing and reading of the cell with respect to a buffer memory (buffer memory M0 or spare buffer memory Ma) corresponding to the OUT line O0.

The control includes control of address filter F0, variable address filter Fa, buffer memory M0, spare buffer memory Ma and selector S0. Further, read.write control circuit 13 controls reading and writing of the cell with respect to a buffer memory (including buffer memory M1 and spare buffer memory Ma) corresponding to OUT line O1. The control includes control of address filter F1, variable address filter Fa, buffer memory M1, spare buffer memory Ma and selector S1.

Address filters F0 to F3 will be described in detail. Address filters F0 to F3 have the same structure. Therefore, address filter F0 will be described as a representative.

Figure 4:
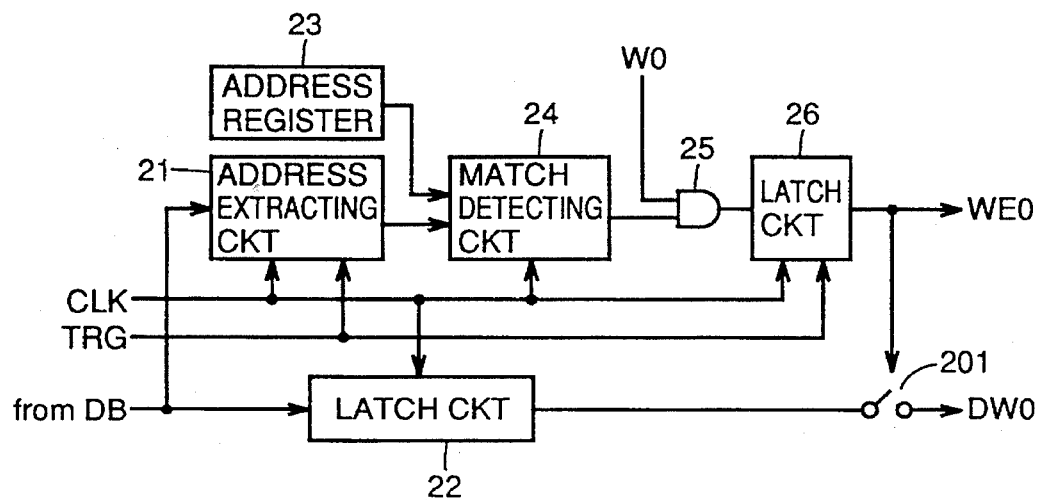
FIG. 4 is a block diagram showing a structure of an address filter shown in FIG. 2.

FIG. 4 is a block diagram showing the structure of address filter F0. Referring to FIG. 4, address filter F0 includes an address extracting circuit 21, latch circuits 22, 26, an address register 23, a match detecting circuit 24, an AND gate 25 and a switch 201.

Address extracting circuit 21 receives a clock signal CLK, a trigger signal TRG and a cell from the data bus. Address extracting circuit 21 operates based on the clock signal CLK, and extracts an address included in the destination information of the cell at a timing defined by the trigger signal TRG. Address extracting circuit 21 applies the extracted address to match detecting circuit 24.

Address register 23 stores an address defined in accordance with the OUT line (in this case OUT line O0) to which address filter F0 corresponds, and applies the address to match detecting circuit 24.

Match detecting circuit 24 receives the clock signal CLK in addition to the aforementioned address. Match detecting circuit 24 operates based on the clock signal CLK, and when addresses applied from address extracting circuit 21 and from address register 23 match with each other, sets its output signal to the high level (hereinafter referred to as H level).

AND gate 25 receives a write control signal W0 and an output signal from match detecting circuit 24, and when these signals are both at the H level, provides an H level output signal.

Latch circuit 26 receives an output signal from AND gate 25, the clock signal CLK and the trigger signal TRG, and provides a write enable signal WE0. In this latch circuit 26, at a timing defined by the trigger signal TRG, the write enable signal WE0 is set to the H level, in response to the H level of the output signal from AND gate 25.

Latch circuit 22 receives a cell from data bus DB and the clock signal CLK. Latch circuit 22 operates based on the clock signal CLK, latches the applied cell for a prescribed time period, and then outputs the cell. The cell output from latch circuit 22 is provided as write data DW0, through switch 201.

Switch 201 turns on/off in response to the write enable signal WE0. More specifically, switch 201 turns on when the write enable signal WE0 is at the H level. Therefore, the write data DW0 is output only when the write enable signal WE0 is at the H level.

In this manner, in address filter F0, when the applied write control signal W0 is at the H level and a cell having in its destination information, the address matching the predetermined address for the corresponding OUT line O0 is input, the cell is fetched and applied to the corresponding buffer memory M0.

In this case, the write enable signal WE0 is at the H level, and the cell indicated as write data DW0 is written in the corresponding buffer memory M0.

Address filters F1 to F3 each have identical structure as the above described address filter F0, and operate in the similar manner.

Variable address filters Fa and Fb will be described in detail. Variable address filters Fa and Fb have identical structure. Therefore, variable address filter Fa will be described as a representative.

Figure 5:
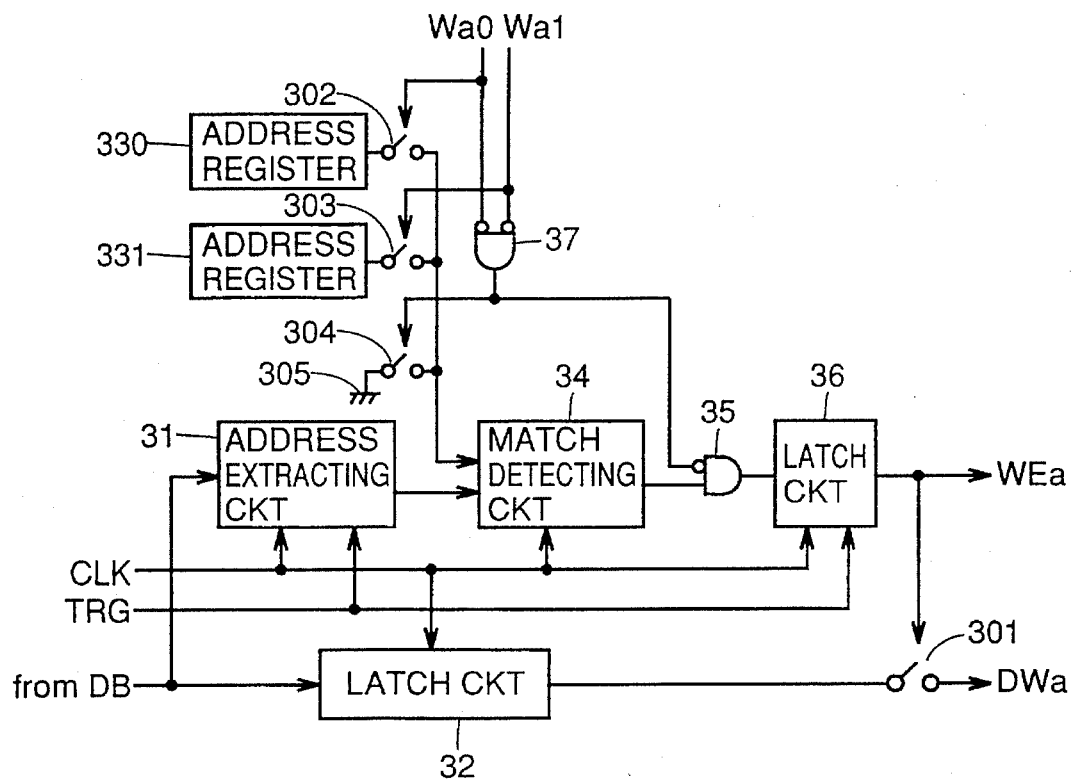
FIG. 5 is a block diagram showing a structure of a variable address filter shown in FIG. 2.

FIG. 5 is a block diagram showing the structure of the variable address filter Fa. Referring to FIG. 5, the variable address filter Fa includes an address extracting circuit 31, latch circuits 32, 36, address registers 330, 331, a match detecting circuit 34, an AND gate 35, switches 301, 302, 303 and 304, and an NOR gate 37.

Address extracting circuit 31, latch circuits 32 and 36, match detecting circuit 34, AND gate 35 and switch 301 in variable address filter Fa correspond to address extracting circuit 21, latch circuits 22 and 26, match detecting circuit 24, AND gate 25 and switch 201 of the address filter F0 shown in FIG. 4, and they have the same structures. Therefore, description is not repeated.

The variable address filter Fa of FIG. 5 differs from address filter F0 of FIG. 2 in that it is provided with NOR gate 37, switches 301, 303 and 304 as well as address registers 330 and 331. NOR gate 37 receives write control signals Wa0 and Wa1. NOR gate 37 sets an output signal to the H level when these write control signals are both at the low level, and otherwise set the output signal to the low level (hereinafter referred to as the L level).

Address register 330 stores a predetermined address corresponding to OUT line O0, and provides the address. Address register 331 stores a predetermined address corresponding to OUT line O1, and provides the address.

The address output from address register 330 is applied to match detecting circuit 34 through switch 302. The address output from address register 331 is applied to match detecting circuit 34 through switch 303. From a ground node 305, the ground potential is applied to match detecting circuit 34 through switch 304.

Switch 302 switches in response to write control signal Wa0. Switch 303 switches in response to write control signal Wa1. Switch 304 switches in response to an output signal from NOR gate 37. Switches 301, 302, 303 and 304 each turn on only when the applied signal is at the H level. Therefore, when write control signal Wa0 is at the H level, address from address register 330 is applied to match detecting circuit 34.

When write control signal Wa1 is at the H level, the address from address register 331 is applied to match detecting circuit 34. When write control signals Wa0 and Wa1 are both at the L level, the ground potential is applied to match detecting circuit 34.

The output signal from NOR gate 37 is inverted and applied to AND gate 35. Therefore, when either one of the write control signals Wa0 and Wa1 is at the H level, and the output signal from match detecting circuit 34 attains to the H level, AND gate 35 provides an H level output signal to latch circuit 36.

In this manner, in variable address filter Fa, when only the applied write control signal Wa0 is at the H level, and a cell having as its destination information, the address corresponding to the predetermined address for the OUT line O0 is input, the cell is fetched, and the cell is applied to the corresponding spare buffer memory Ma. In this case, write enable signal WEa is at the H level, and the cell represented as write data DWa is written in the spare buffer memory Ma. Namely, in such a case, variable address filter Fa and spare buffer memory Ma operate in place of address filter F0 and buffer memory M0, respectively.

Meanwhile, when write control signal Wa1 is at the H level, and the cell having as its destination information, the address corresponding to the predetermined address for the OUT line O1 is input, variable address filter Fa fetches the cell and applies the cell to the spare buffer memory Ma.

In this case, also, the write enable signal WEa is at the H level, and the cell represented as write data DWa is written in spare buffer memory Ma. Namely, in this case, variable address filter Fa and spare buffer memory Ma operate in place of address filter F1 and buffer memory M1, respectively.

When write control signals Wa0 and Wa1 are both at the L level, the ground potential is applied to match detecting circuit 34, and therefore match detection is not carried out in match detecting circuit 34.

Further, since the signal applied to AND gate 35 from NOR gate 37 attains to the H level, the output of AND gate 35 never attains to the H level. Therefore, in such a case, write enable signal WEa attains to the L level, and for this reason, write data DWa is not output. Namely, in this case, variable address filter Fa is set to the standby state.

Variable address filter Fb has similar structure as the variable address filter Fa, and operates in the similar manner.

The selectors S0 to S3 will be described in detail. These selectors have identical structure. Therefore, only the selector S0 will be described as a representative.

Figure 6:
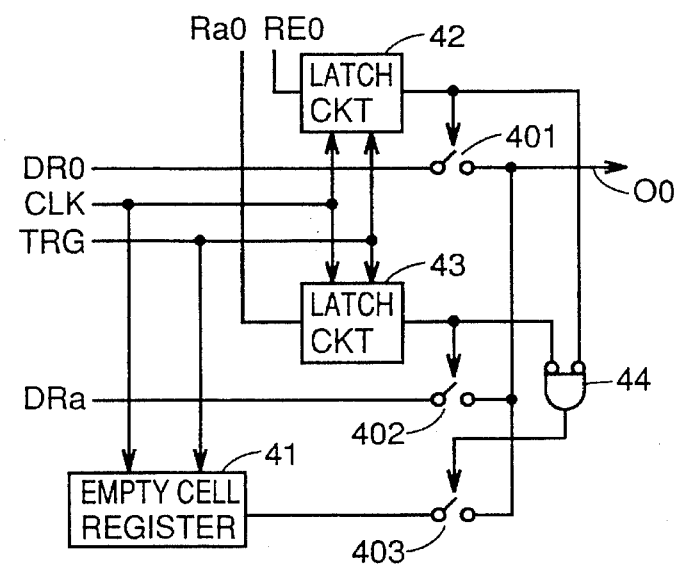
FIG. 6 is a block diagram showing a structure of a selector shown in FIG. 2.

FIG. 6 is a block diagram showing the structure of selector S0. Referring to FIG. 6, the selector S0 includes an empty cell register 41, latch circuits 42 and 43, an NOR gate 44, and switches 401, 402 and 403.

Read data DR0 is output to OUT line O0 through switch 401. Read data DRa is output to OUT line O0 through switch 402. Empty cell register 41 stores in advance empty cell data which is the data indicating that there is not a cell to be output. Empty cell register 41 receives the clock signal CLK and the trigger signal TRG.

Empty cell register 41 operates based on clock signal CLK, and provides empty cell data at a timing defined by the trigger signal TRG. The empty cell data output from empty cell register 41 is output to OUT line O0 through switch 403.

Latch circuit 42 receives read enable signal RE0, clock signal CLK and trigger signal TRG. Latch circuit 42 operates based on the clock signal CLK, and outputs, at a timing defined by trigger signal TRG, the read enable signal RE0 to switch 401 and to NOR gate 44.

Latch circuit 43 receives read control signal Ra0, clock signal CLK and trigger signal TRG. Latch circuit 43 operates based on clock signal CLK, and applies, at a timing defined by trigger signal TRG, the read control signal Ra0 to switch 402 and to NOR gate 44.

NOR gate 44 applies an output signal to switch 403 in response to the signals applied from latch circuits 42 and 43. Therefore, the output signal from NOR gate 44 attains to the H level only when the output signals from latch circuits 42 and 43 are both at the L level.

Switch 401 turns on when the output signal from latch circuit 42 attains to the H level. Switch 402 turns on when the output signal from latch circuit 43 attains to the H level. Switch 403 turns on when the output signal from NOR gate 44 attains to the H level.

Consequently, when the read enable signal RE0 attains to the H level, read data DR0 is output to OUT line O0, and when the read control signal Ra0 attains to the H level, read data DRa is output to OUT line O0. When read enable signal RE0 and read control signal Ra0 both attain to the L level, empty cell data is output to OUT line O0.

The overall operation of the unit switch shown in FIGS. 1 to 6 will be described, referring to the relation between the input signal and the output signal of the control circuits C1 and C2. Here, relation between the input/output signals of control signal C1 will be described as a representative.

Figure 7:
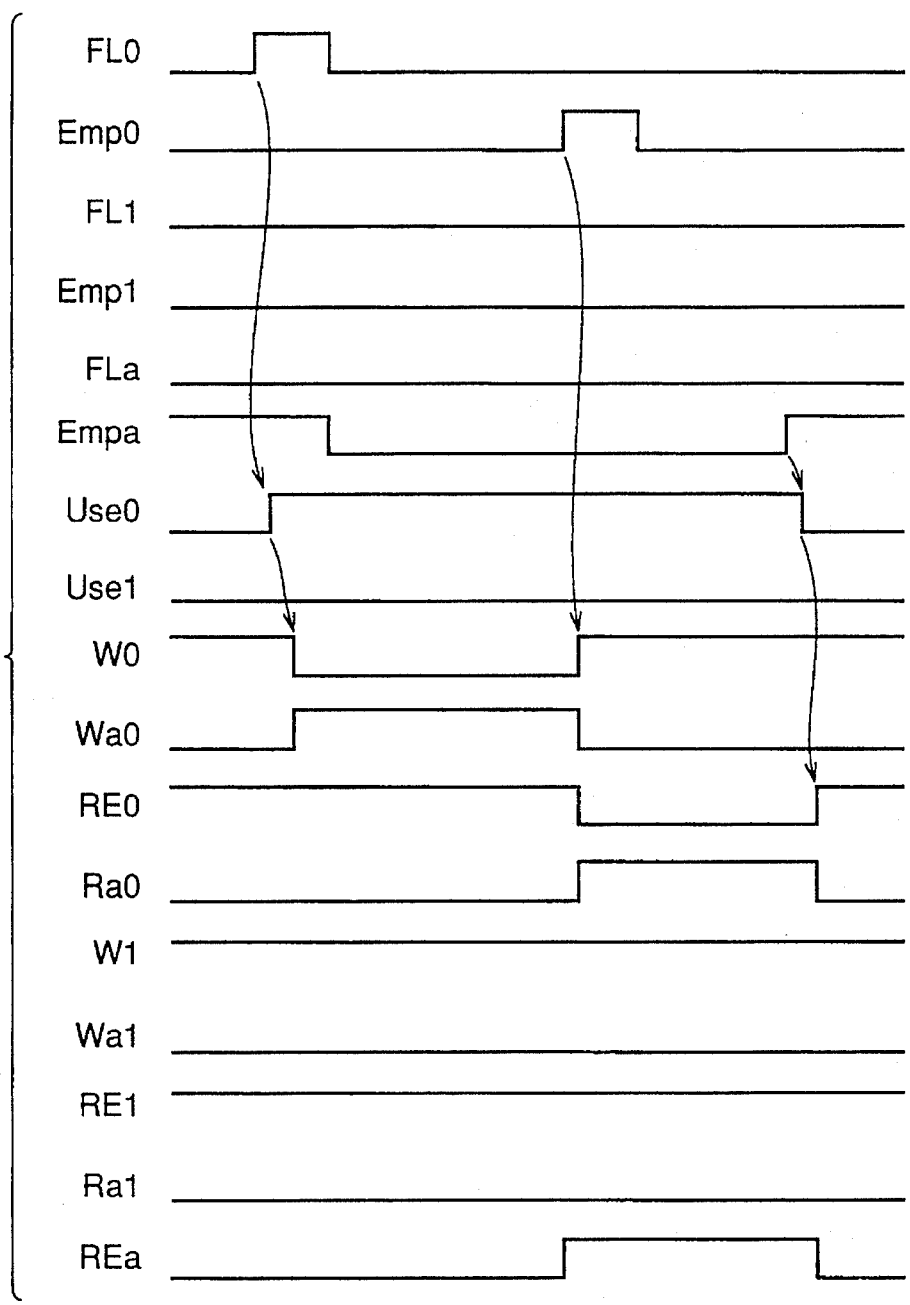
FIG. 7 is a timing chart showing the operation of the control circuit shown in FIG. 3.

FIG. 7 is a timing chart showing the operation of control circuit C1.

(1) Normal operation

Referring to FIG. 7, in the normal operation, full signals FL0, FL1 and FLa and empty signals Emp0 and Emp1 are at the L level, and empty signal Empa is at the H level. More specifically, in the normal operation, write control signals W0 and W1 as well as read enable signals RE0 and RE1 are at the H level. Other signals are at the L level.

Therefore, in the normal operation, address filters F0 and F1 operate, and writing and reading of cells are performed in buffer memories M0 and M1, respectively. In this case, variable address filter Fa and spare buffer memory Ma are in the standby state.

(2) When buffer memory M0 becomes full.

When buffer memory M0 becomes full, the full signal FL0 rises to the H level. In response, allocation control signal Use0 rises to the H level. Further in response, write control signal W0 falls to the L level, and write control signal Wa0 rises to the H level.

Consequently, address filter F0 stops fetching the cells. Accordingly, variable address filter Fa starts fetching the cell having OUT line O0 as its destination, and writing of the fetched cell in spare buffer memory Ma starts.

In this state, read enable signal RE0 maintains the H level, and therefore reading of the cells from buffer memory M0 continues. Meanwhile, in spare buffer memory Ma, reading of cells is not performed, since read enable signal REa maintains the L level. Accordingly, thereafter the full signal FL0 falls to the L level, and empty signal Empa also falls to the L level.

(3) When buffer memory M0 becomes empty.

Then, since only reading of the cells takes place in buffer memory M0, the buffer memory M0 eventually becomes empty, and the empty signal Emp0 rises to the H level. In response, write control signal W0, read control signal Ra0 and read enable signal REa rise to the H level, while write control signal Wa0 and read enable signal RE0 fall to the L level.

Secondly, address filter F0 starts fetching the cells, and writing of cells to buffer memory M0 is re-started. However, reading of the cells from buffer memory M0 is stopped.

Meanwhile, fetching of the cells by variable address filter Fa is stopped, and writing of the cells to spare buffer memory Ma is stopped. Reading of the cells from spare buffer memory Ma starts. Selector S0 provides the cell read from spare buffer memory Ma to OUT line O0.

(4) When spare buffer memory Ma becomes empty

Thereafter, spare buffer memory M0 becomes empty as the cells are read out, and empty signal Empa rises to the H level. In response, allocation control signal Use0 falls to the L level. Further in response, read enable signal RE0 rises to the H level, and read control signal Ra0 and read enable signal REa fall to the L level.

As a result, reading of the cells from spare buffer memory Ma is stopped, while reading of the cells from buffer memory M0 is re-started. Accordingly, selector S0 outputs the cell read from buffer memory M0 to OUT line O0.

In this manner, in the unit switch of FIG. 2, when one buffer memory becomes full, the spare buffer memory stores the cell instead of that memory. Therefore, the ratio of disposal of the cells can be suppressed. Further, in that case, reading of the cells from the buffer memory is continued until the full buffer memory becomes empty, and thereafter, reading of the cells from the spare buffer memory is performed.

Next, relation between the cells input through IN lines I0 to I3 and the cells written to buffer memories M0 to M3 and spare buffer memories Ma and Mb will be described.

Figure 8:
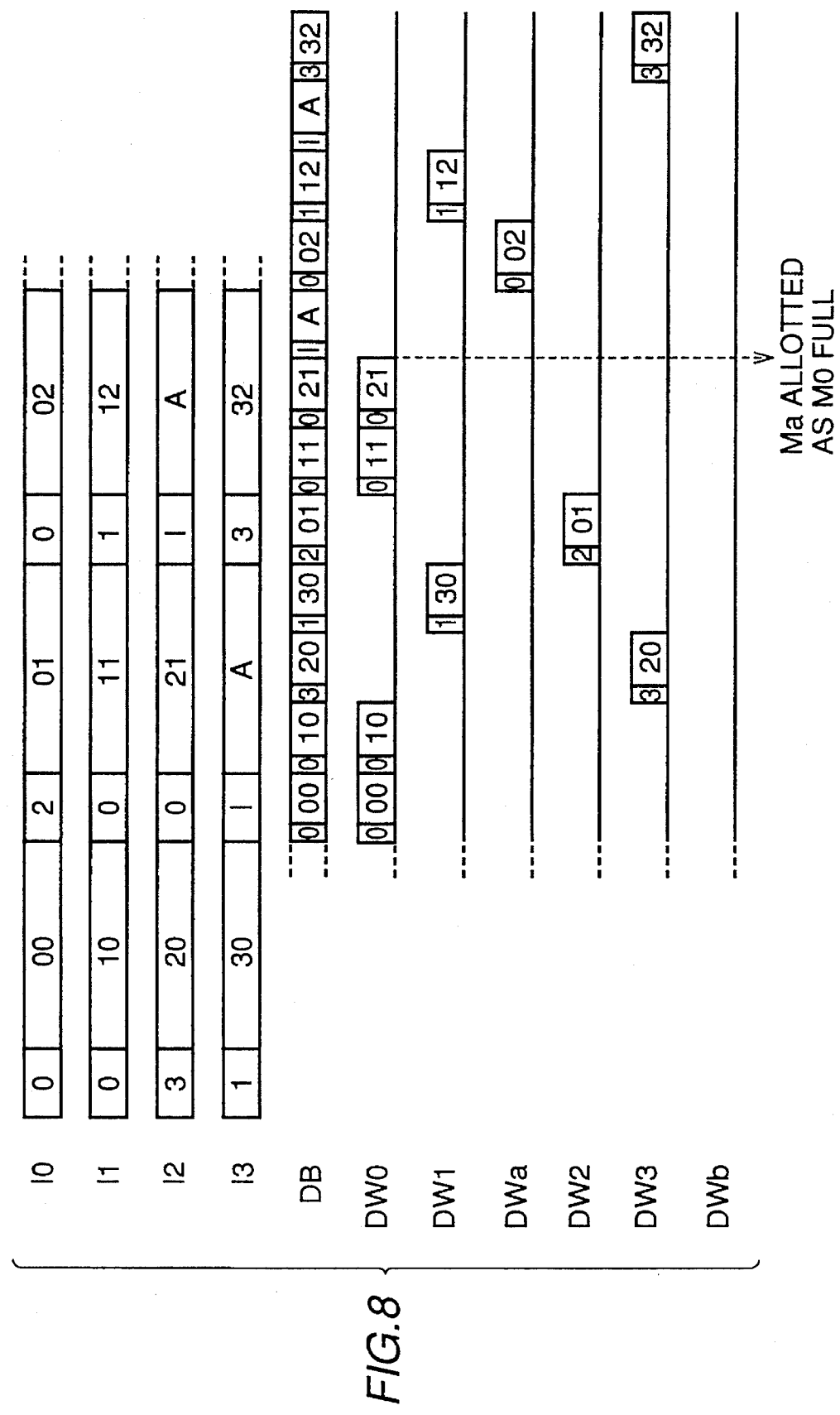
FIG. 8 is a schematic diagram showing relation between a cell input through an IN line and a cell written in a buffer memory and a spare buffer memory.

FIG. 8 is a schematic diagram showing the relation between the cells input through In lines I0 to I3 and the cells written to buffer memories M0 to M3 and spare buffer memories Ma and Mb.

Referring to FIG. 8, one cell is indicated by a block of destination information address represented by one digit of numeral (corresponds to OUT line O0, 1 corresponds to O1, 2 corresponds to O2 and 3 corresponds to O3), and a cell number indicated by two digits of numerals on the right side. However, an empty cell has I appended to said address block, and A appended to the cell number block.

Referring to FIG. 8, cells O0, O1 and O2 are successively input from In line I0. Cells 10, 11 and 12 are input through In line I1. Cells 20, 21 and A are input through In line I2. Cells 30, A, 32 are input through IN line I3.

Referring to the data train of data bus DB, the cells input through IN lines I0 to I3, respectively, are applied in the order of input, to data bus DB. Referring to write data DW0 to DWb, the cells applied to data bus DB are fetched by respective address filters.

Here, referring to write DW0, for example, assume that buffer memory M0 becomes full at the time when it fetches cell 21. Referring to write data DWa, in that case, variable address filter Fa fetches the cell O2 corresponding to OUT line O0.

In this manner, in the unit switch in accordance with the first embodiment, when any of the buffer memories M0 to M3 becomes full, writing of the cell to the buffer memory is stopped and, alternatively, writing of the cell is effected by the corresponding variable address filter and the spare buffer memory. Accordingly, when cells having a specific OUT line as their destinations are input concentratedly, the ratio of disposal of the cells can be suppressed.

Further, in the unit switch, since spare buffer memories Ma and Mb are provided to reduce the ratio of disposal of the cells, it is not necessary to increase the capacity of the buffer memories M0 to M3. Therefore, the scale of the hardware is not increased.

Second Embodiment

Figure 9:
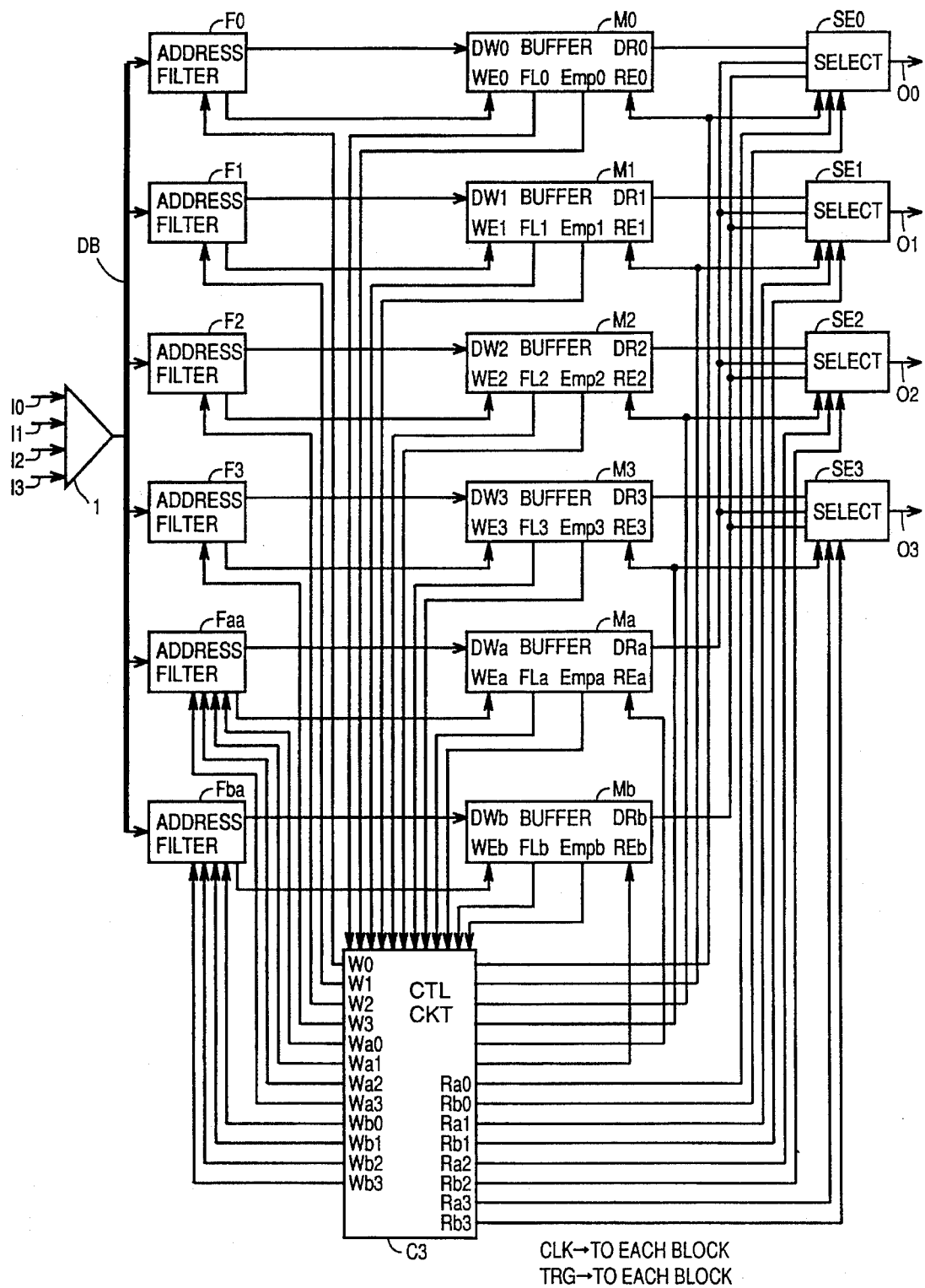
FIG. 9 is a block diagram showing a structure of a unit switch in accordance with a second embodiment.

FIG. 9 is a block diagram showing a structure of a unit switch in accordance with a second embodiment. In FIG. 9, portions corresponding to those of FIG. 2 are denoted by the same reference characters and description thereof is not repeated.

Referring to FIG. 9, the unit switch differs from that of FIG. 2 in that one spare buffer memory is provided not corresponding to certain buffer memories but provided as a spare for all the buffer memories. More specifically, each of the spare buffer memories Fa and Fb is capable of storing cells when any of the buffer memories F0 to F3 becomes full, instead of the full buffer memory.

The variable address filters Faa and Fba have the identical structure. Therefore, variable address filter Faa will be described as a representative. Variable address filter Faa has similar structure as variable address filter shown in FIG. 5. More specifically, variable address filter Faa is a modification of the variable address filter of FIG. 5, which includes address registers corresponding to OUT lines O2 and O3, respectively, and the NOR gate 37 of FIG. 5 adapted to received four inputs of write control signals Wa0 to Wa3.

Accordingly, the variable address filter Faa can selectively fetch cells corresponding to OUT lines O0 to O3, respectively, in response to the write control signals Wa0 to Wa3. Similarly, variable address filter Fba can selectively fetch the cells corresponding to OUT lines O0 to O3, respectively, in response to write control signals Wb0 to Wb3.

Selectors SE0 to SE3 have identical structure. Therefore, selector SE0 will be described as a representative. Selector SE0 has a similar structure as the selector shown in FIG. 6.

More specifically, selector SE0 is a modification of the selector shown in FIG. 6 in that it is adapted to output the read data DRb from spare buffer memory Mb to OUT line O0 through a switch, and it is adapted to apply the read control signal Rb0 from control circuit C3 as the control signal of the said switch through a latch circuit. Further, the NOR gate 44 of FIG. 6 is adapted to received three inputs, including the read control signal Rb0 through the said latch circuit as an input signal.

Consequently, selector SE0 can selectively output one of the read data DR0, DRa and DRb applied from buffer memory M0 and spare buffer memories Ma and Mb, to OUT line O0. Similarly, selectors SE1 to SE3 each selectively output the read data from the corresponding buffer memory and spare buffer memories Ma and Mb to the corresponding OUT line.

Control circuit C3 receives full signals FL0 to FL3 and FLa and FLb from buffer memories M0 to M3 and spare buffer memories Ma and Mb, as well as empty signals Emp0 to Emp3 and Empa and Empb. Control circuit C3 provides write control signals W0 to W3, Wa0 to Wa3, Wb0 to Wb3, read enable signals RE0 to RE3, REa, REb and read control signals Ra0 to Ra3 and Rb0 to Rb3, in response to the input signals.

Accordingly, control circuit C3 controls address filters F0 to F3, variable address filters Faa, Fba, buffer memories M0 to M3, spare buffer memories Ma, Mb and selectors SE0 to SE3.

Different from the unit switch shown in FIG. 2 in which one spare memory is provided for every prescribed number of buffer memories, the unit switch of FIG. 9 is characterized in that a plurality of spare buffer memories are provided commonly for every buffer memory.

Specific example of the control by control circuit C3 will be described. In normal operation, the unit switch of FIG. 9 operates in the similar manner as in the unit switch of FIG. 2. However, when any of the buffer memories M0 to M3 becomes full, it operates in the following manner.

Here, let us assume that buffer memory M0 becomes full at first, and then buffer memory M1 becomes full, as an example.

When buffer memory M0 becomes full, the full signal FL0 attains to the H level. In response, write control signal W0 attains to the L level, and write control signal Wa0 attains to the H level. Consequently, fetching of the cells by address filter F0 is stopped, and fetching of the cells having the OUT line O0 as the destination information is started by variable address filter Faa.

Control of the reading of cells from buffer memory M0 and reading of the cells from spare buffer memory Ma are effected in the similar manner as in the unit switch of FIG. 2.

More specifically, until all the cells written in buffer memory M0 are read, selector SE0 selectively outputs read data DR0, and thereafter, selectively outputs read data DRa from spare buffer memory Ma.

Assume that buffer memory M1 becomes full in such a state. In this case, since spare buffer memory Ma is allotted to OUT line O0, variable address filter Fba and spare buffer memory Mb operate in place of address filter F1 and buffer memory M1, effecting writing and reading of the cells having the OUT line O1 as the destination.

More specifically, full signal FL1 attains to the H level, and in response, write control signal W1 falls to the L level and write control signal Wb1 attains to the H level. Consequently, fetching of the cells from address filter F1 is stopped, and fetching of the cells having the OUT line O1 as the destination information is started by variable address filter Fba.

Control of reading of the cells from buffer M1 and reading of the cells from spare buffer memory Mb are effected in the similar manner as in the unit switch of FIG. 2.

Thus, in the unit switch of FIG. 9, since a plurality of spare buffer memories Ma and Mb are provided common to all the buffer memories M0 to M3, disposal of the cells can be prevented even if two of the buffer memories become full simultaneously.

Further, since spare buffer memories Ma and Mba are provided to reduce the ratio of disposal of the cells in this unit switch, increase in scale of the hardware can be suppressed as in the first embodiment.

In a unit switch in which one spare buffer memory corresponds to every prescribed number of buffer memories, the spare buffer memory can read and write the cells only in place of the corresponding buffer memory, which prevents effective use of the spare buffer memory. However, in the unit switch of FIG. 9, since a plurality of spare buffer memories are provided common to all the buffer memories, the spare buffer memory can be used effectively.

Third Embodiment

Figure 10:
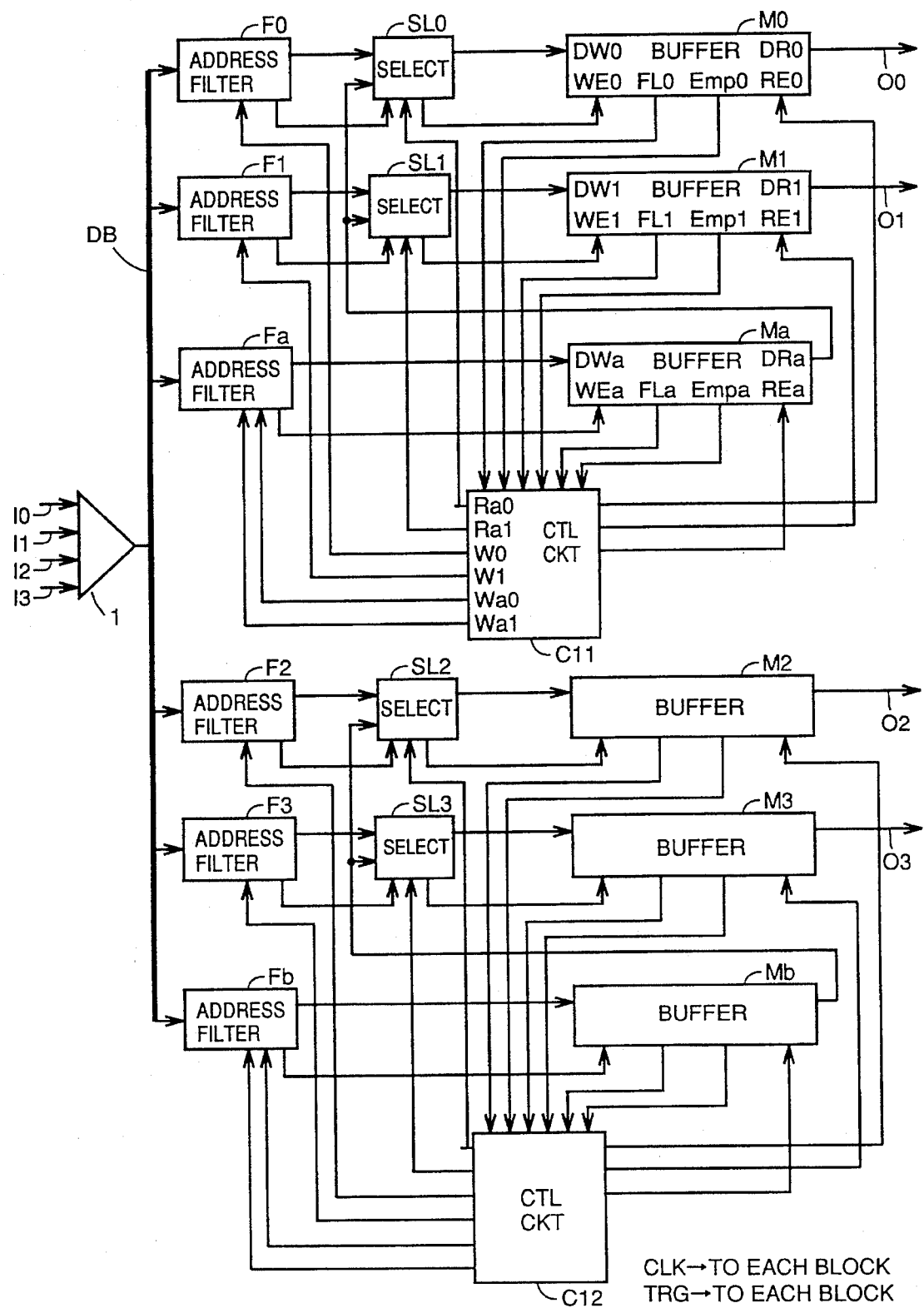
FIG. 10 is a block diagram showing a structure of a unit switch in accordance with a third embodiment.

A third embodiment will be described. FIG. 10 is a block diagram showing a structure of a unit switch in accordance with the third embodiment.

Referring to FIG. 10, the unit switch differs from the unit switch of FIG. 2 in that selectors SL0 to SL3 are provided not on the output side but on the input side of the buffer memories M0 to M3.

Selector SL0 is provided corresponding to OUT line O0. Selector SL1 is provided corresponding to OUT line O1. Selector SL2 is provided corresponding to OUT line O2. Selector SL3 is provided corresponding to OUT line O3. Here, the portion corresponding to OUT lines O0 and O1 have the same structure as the portion corresponding to OUT lines O2 and O3. Therefore, only the portion corresponding to OUT lines O0 and O1 will be described in the following.

Selector SL0 receives write data DW01 and write enable signal WE01 from address filter F0. These signals are the same as write data DW0 and write enable signal WE0 provided from address filter F0 in FIG. 2. Selector SL0 further receives read data DRa from spare buffer memory Ma and read control signal Ra0 from control circuit C11.

In response to the aforementioned input signals, selector SL0 provides write data DW0 and write enable signal WE0 to buffer memory M0. Here, write data DW0 is one of the write data DW01 from address filter F0 or read data DRa from spare buffer memory Ma.

Selector SL1 receives write data DW11 and write enable signal WE11 from address filter F1. These signals are the same as write data DW1 and write enable signal WE1 provided from address filter F1 in FIG. 2. Selector SL1 further receives read data DRa from spare buffer memory Ma and read control signal Ra1 from control circuit C11.

In response to the input signals, selector SL1 applies write data DW1 and write enable signal WE1 to buffer memory M1. Here, write data DW1 is one of the write data DW11 from address filter F1 and read data DRa from spare buffer memory Ma.

The read data DR0 output from buffer memory M0 is directly output to OUT line O0. Read data DR1 output from buffer memory M1 is directly output to OUT line O1.

Selectors SL0 to SL3 will be described in detail. Selectors SL0 to SL3 have identical structure. Therefore, selector SL0 will be described as a representative.

Figure 11:
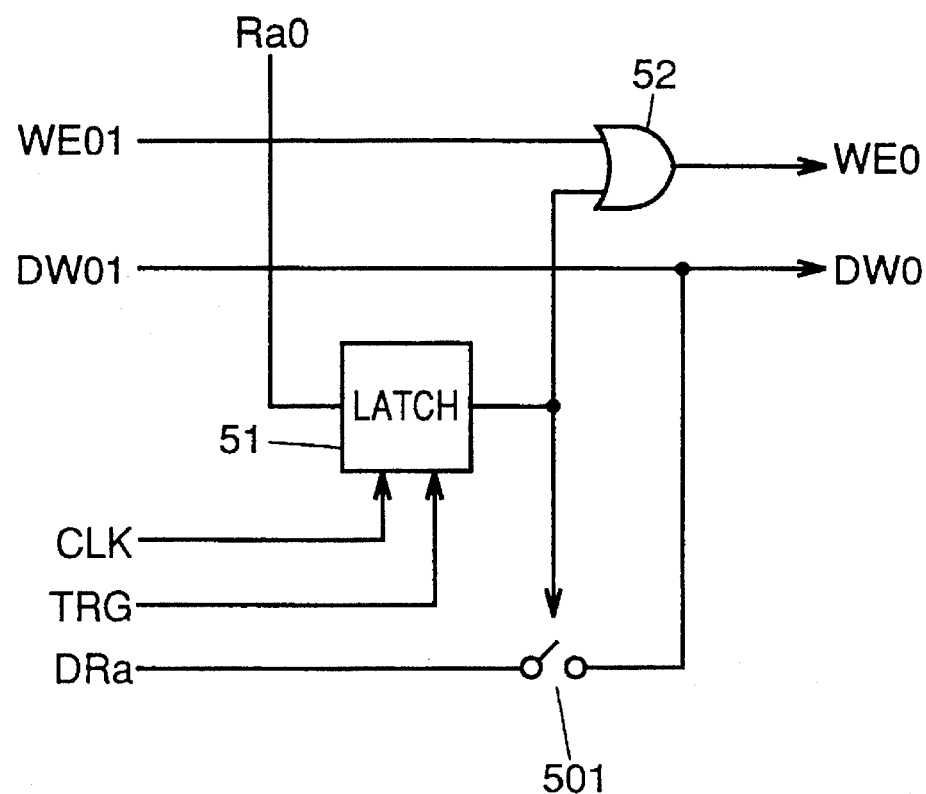
FIG. 11 is a block diagram showing a structure of a selector shown in FIG. 10.

FIG. 11 is a block diagram showing the structure of selector SL0 shown in FIG. 10.

Referring to FIG. 11, the selector SL0 includes a latch circuit 51, an OR gate 52 and a switch 501. Latch circuit 51 receives read control signal Ra0, clock signal CLK and trigger signal TRG. Latch circuit 51 operates based on the clock signal CLK, and at a timing defined by trigger signal TRG, provides the read control signal Ra0.

The output signal from latch circuit 51 is applied to OR gate 52 and switch 501. Read data DRa is output as write data DW0 through switch 501.

Switch 501 switches in response to the output signal from latch circuit 51. The switch 501 turns on when the output signal from latch circuit 51 is at the H level.

Write data DW01 is output directly as write data DW0. Therefore, write data DW0 correspond to either the write data DW01 or read data DRa.

OR gate 52 receives, in addition to the output signal from latch circuit 51, the write enable signal WE01, and provides a write enable signal WE0. Therefore, write enable signal WE0 attains to the H level when the write enable signal WE01 or the output signal from latch circuit 51 is at the H level.

In this manner, in selector SL0 of FIG. 11, when write data DW01 and write enable signal WE01 are applied from address filter F0, these signals are provided as write data DW0 and write enable signal WE0.

Meanwhile, when read data DRa is applied from spare buffer memory Ma and read control signal Ra0 is applied from control circuit C11, selector SL0 provides these signals as write data DW0 and write enable signal WE0.

The overall operation of the unit switch shown in FIG. 10 will be described, with reference to the relation between control signals and input signals in each of the control circuits C11 and C12. Here, the relation between the input/output signals in control circuit C11 will be described as a representative.

Figure 12:
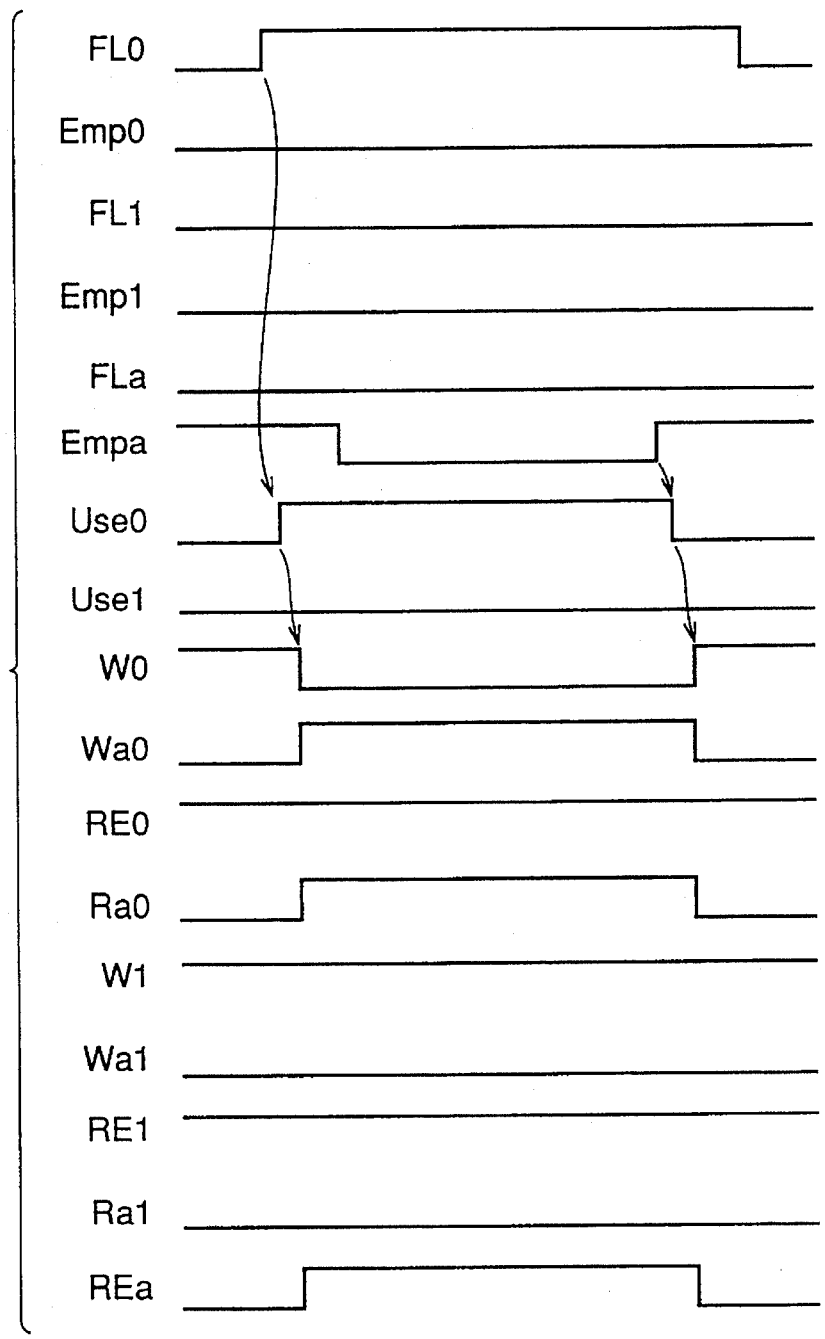
FIG. 12 is a timing chart showing an operation of the control circuit shown in FIG. 10.

FIG. 12 is a timing chart showing the operation of control circuit C11.

(1) Normal operation

Referring to FIG. 12, the normal operation corresponds to the operation in which full signals FL0, FL1, FLa and empty signals Emp0 and Emp1 are at the L level and empty signal Empa is at the H level. Namely, in the normal operation, write control signals W0 and W1, and read enable signals RE0 and RE1 are at the H level.

Accordingly, in the normal operation, address filters F0 and F1 operate. Accordingly, cells are written to the buffer memory M0 through address filter F0 and selector SL0, and cells are written to buffer memory M1 through address filter F1 and selector SL1. Cells are read from buffer memories M0 and M1 and output to OUT lines O0 and O1.

In this case, variable address filter Fa and spare buffer memory Ma are at the standby state.

(2) When buffer memory M0 becomes full

When buffer memory M0 becomes full, the full signal FL0 attains to the H level. In response, allotment signal Use0 rises to the H level. In response, write control signal W0 falls to the L level, while write control signal Wa0, read control signal Ra0 and read enable signal REa rise to the H level.

The switching of the cells from address filter F0 is stopped, and fetching of the cells having OUT line O0 as the destination information from variable address filter Fa is started. Further, reading of the cells from spare buffer memory Ma is permitted, and in response to read control signal Ra0, selector SL0 allows transmission of the cells read from spare buffer memory Ma to buffer memory M0.

In this state, the cells having OUT line O0 as the destination are written from variable address filter Fa to spare buffer memory Ma, and the written cells are successively written from spare buffer memory Ma to buffer memory M0 through selector SL0. Consequently, the storage capacity with respect to the cells having OUT line O0 as the destination comes to be the sum of the storage capacity of buffer memory M0 and the storage capacity of spare buffer memory Ma. Namely, it means that the storage capacity of the cells corresponding to OUT line O0 is temporarily enlarged. Accordingly, disposal of the cells when buffer memory M0 becomes full can be prevented. Since the cells are written in spare buffer memory Ma, the empty signal Empa falls to the L level.

(3) When spare buffer memory Ma becomes empty

Thereafter, when the cells having OUT line O0 as the destination decrease and spare buffer memory Ma becomes empty, the empty address signal Empa rises to the H level. In response, the allocation control signal Use0 falls to the L level.

Further in response, write control signal W0 rises to the H level, and write control signal Wa0, read control signal Ra0 and read enable signal REa fall to the L level. Consequently, fetching of the cells from address filter F0 is re-started, and fetching of the cells from variable address filter Fa is stopped.

Further, reading of the cells from spare buffer memory Ma is stopped, and selector SL0 applies the write data DW0 and write enable signal WE0 to buffer memory M0 in response to the write data DW01 and write enable signal WE01 from address filter F0. In other words, the operation returns to the normal operation in which cells fetched from address filter F0 is written to buffer memory M0 through selector SL0.

In this manner, in the unit switch shown in FIG. 10, when one buffer memory becomes full, the spare buffer memory is connected in the preceding stage of the buffer memory. Therefore, storage capacity of the memory corresponding to a specific OUT line can be increased, thus reducing the ratio of disposal of the cells.

Further, in this unit switch, since spare buffer memories Ma and Mb are provided to reduce the ratio of disposal of the cells, increase in scale of the hardware can be suppressed in the same manner as in the first and second embodiments.

Further, since the cells written in the spare buffer memory are successively read and transmitted to the buffer memory, the buffer memory can be returned quickly to the standby state, as compared with the unit switches of the first and second embodiments. Therefore, it can quickly cope with the full states of the buffer memories when such state occur one after another.

Fourth Embodiment

Figure 13:
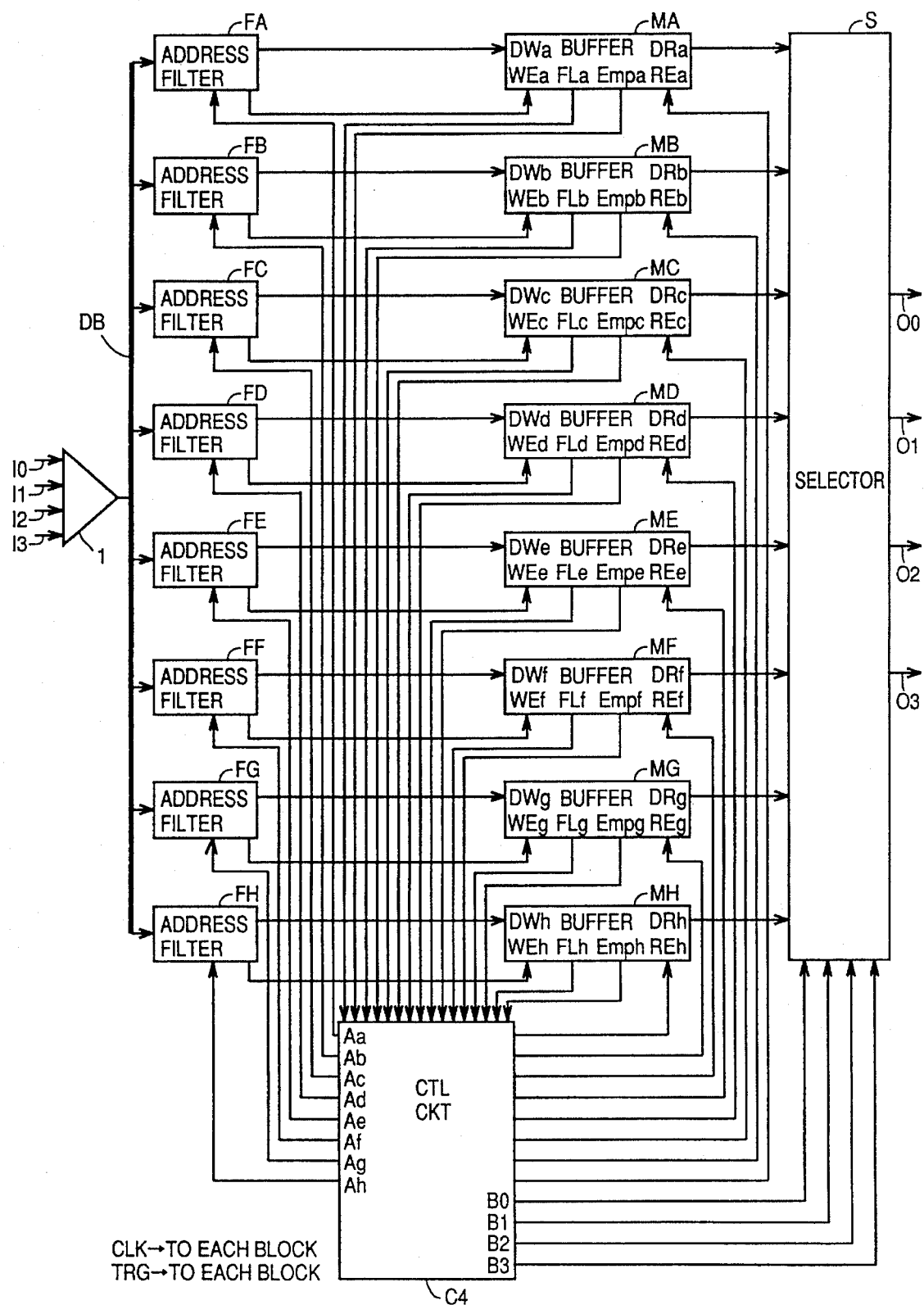
FIG. 13 is a block diagram showing a structure of a unit switch in accordance with a fourth embodiment.

A fourth embodiment will be described. FIG. 13 is a block diagram showing the structure of a unit switch in accordance with the fourth embodiment. Referring to FIG. 13, the unit switch includes a multiplexer 1, variable address filters FA to FH, buffer memories MA to MH, a selector S and a control circuit C4.

Variable address filters FA to FH are provided corresponding to buffer memories MA to MH, respectively. Each of the variable address filters FA to FH can selectively fetch cells having one of the OUT lines O0 to O3 as destination information. In each of the variable address filters FA to FH, the cell to be fetched is changed in response to address control signals Aa to Ah from control circuit C4.

Variable address filters FA to FH apply write data DWa to DWh and write enable signals WEa to WEh to corresponding buffer memories MA to MH, respectively.

Buffer memories MA to MH further receives read enable signals REa to REh. Buffer memories MA to MH write the cells indicated by write data DWa to DWh, in response to write enable signals WEa to DWh. Buffer memories MA to MH apply to selector S read data DRa to DRh in response to read enable signals REa to REh. Further, buffer memories MA to MH apply to control circuit C4 full signals FLa to FLh and empty signals Empa to Emph.

Selector S receives selection control signals B0 to B3 from control circuit C4, and in response to these signals, select four signals out of the applied read data DRa to DRh, and applies the selected signals to OUT lines O0 to O3, respectively.

In response to the aforementioned input signals, control circuit C4 provides address control signals Aa to Ah, read enable signals REa to REh and selection control signals B0 to B3, respectively.

The unit switch shown in FIG. 13 will be described in greater detail.

Figure 14:
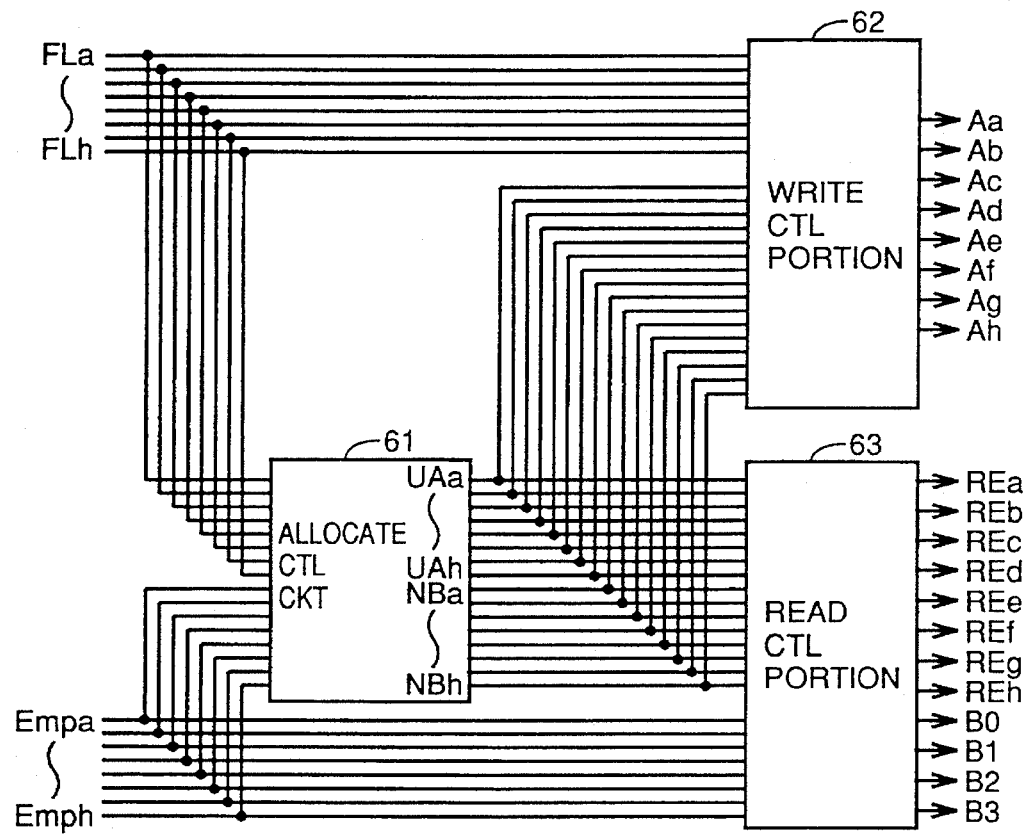
FIG. 14 is a block diagram showing a structure of a control circuit shown in FIG. 13.

First, control circuit C4 will be described in detail. FIG. 14 is a block diagram showing the structure of control circuit C4.

Referring to FIG. 14, the control circuit C4 includes allocation control portion 61, write control portion 62 and read control portion 63. Allocation control portion 61 receives full signals FLa to FLh and empty signals Empa to Emph, respectively. Allocation control portion 61 provides, in response to these input signals, allotted OUT line numbers UAa to UAh and next buffer numbers NBa to NBh.

The allotted OUT line numbers UAa to UAh correspond to buffer memories MA to MH, respectively, and these are data signals indicative of the OUT line numbers to which respective buffer memories correspond at present. The next buffer numbers NBa to NBh are data signals indicative of the buffer memories allotted next to the OUT lines to which the buffer memories correspond at present.

Write control portion 62 receives full signals FLa to FLh, allotted OUT line numbers UAa to UAh, and next buffer numbers NBa to NBh. Write control portion 62 provides address control signals Aa to Ah in response to these input signals. Read control portion 63 receives empty signals Empa to Emph, allotted OUT line numbers UAa to UAh, and next buffer numbers NBa to NBh. Read control portion 63 provides read enable signals REa to REh and selection control signals B0 to B3, in response to these input signals.

Variable address filters FA to FH will be described in detail. Address filters FA to FH have identical structure. Therefore, variable address filter Fa will be described as a representative.

Figure 15:
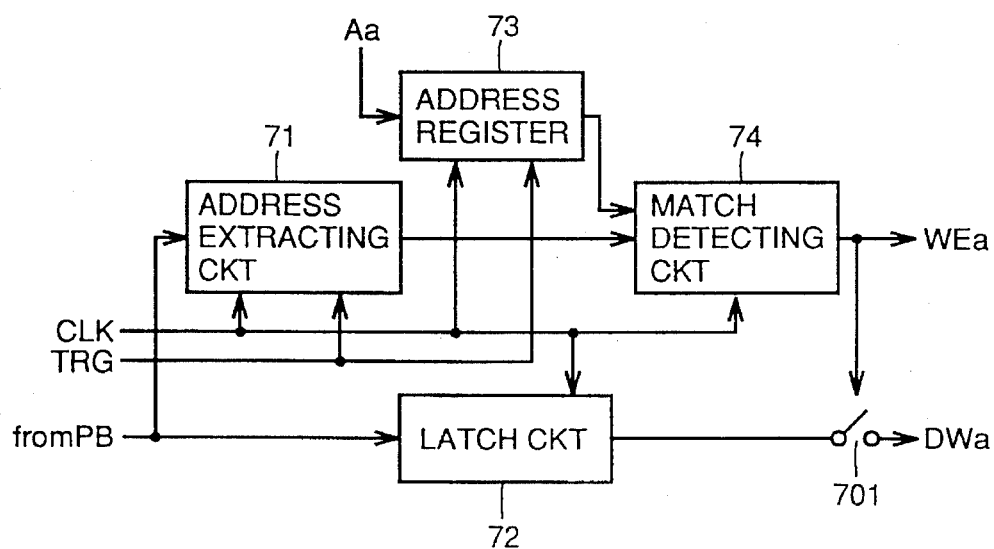
FIG. 15 is a block diagram showing a structure of a variable address filter shown in FIG. 13.

FIG. 15 is a block diagram showing the structure of variable address filter FA.

Referring to FIG. 15, variable address filter FA includes an address extracting circuit 71, a latch circuit 72, an address register 73, a match detecting circuit 74 and a switch 701. Address extracting circuit 71, latch circuit 72, match detecting circuit 74 and switch 701 correspond to address extracting circuit 31, latch circuit 32, match detecting circuit 34 and switch 301 of the variable address filter shown in FIG. 5.

Address register 73 receives an address control signal Aa, clock signal CLK and trigger signal TRG. Address register 73 operates in response to clock signal CLK and trigger signal TRG, stores the address indicated by address control signal Aa, and applies the address to match detecting circuit 74.

The output signal from match detecting circuit 74 is output as write enable signal WEa, and applied as a control signal, to switch 701. Switch 701 turns on when write enable signal WEa attains to the H level, and provides, in that case, the output signal from latch circuit 72 as write data DWa.

In such a variable address filter FA, the address stored in address register 73 is changed by address control signal Aa, and therefore cells can be fetched corresponding to all OUT lines O0 to O3.

Figure 16:
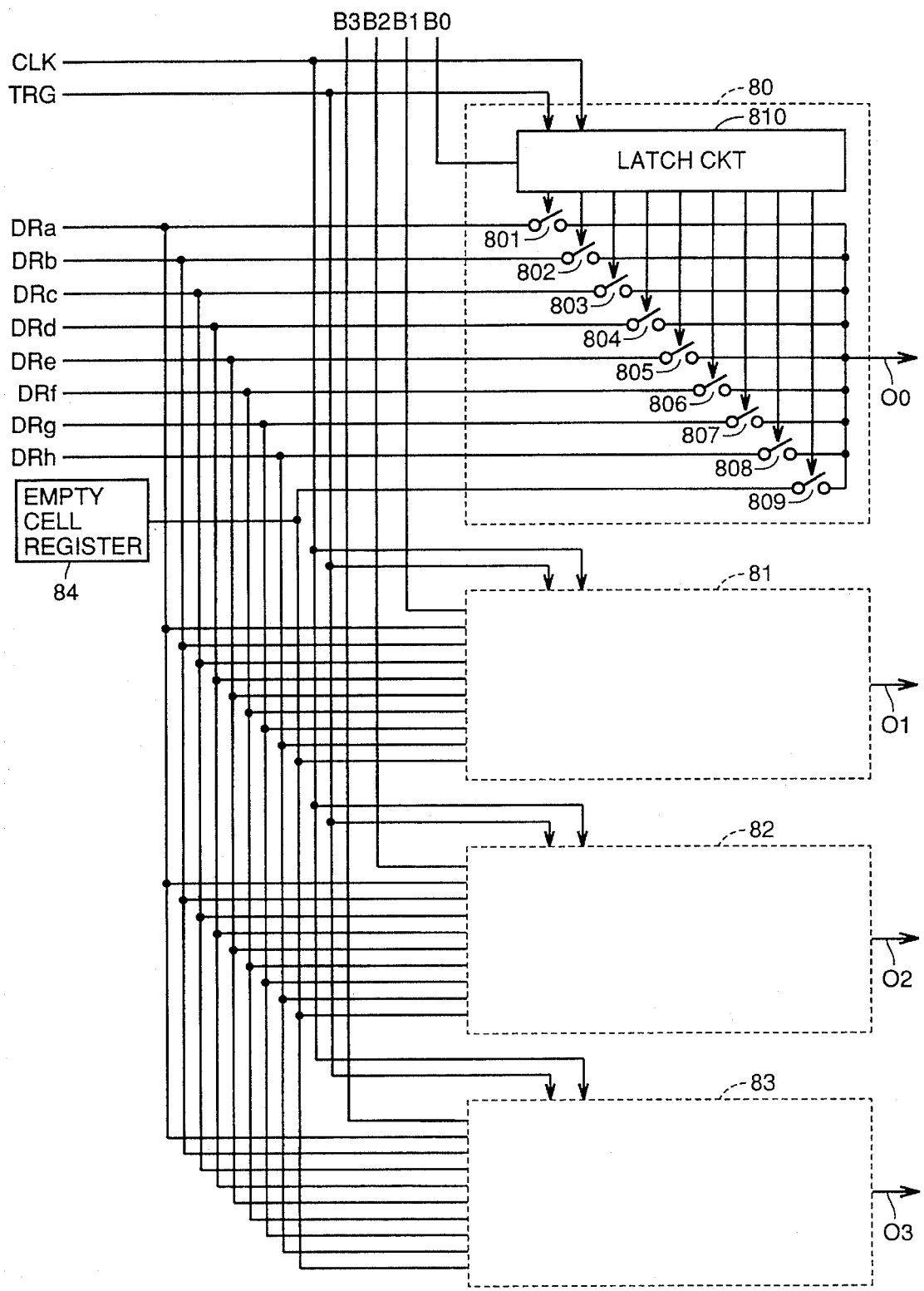
FIG. 16 is a block diagram showing a structure of a selector shown in FIG. 13.

The selector S will be described in detail. FIG. 16 is a block diagram showing the structure of selector S.

Referring to FIG. 16, selector S includes output selecting circuits 80 to 83, and an empty cell register 84. Each of the output selecting circuits 80 to 83 receives clock signal CLK, trigger signal TRG, read data DRa to DRh, and an output from the empty cell register 84. Further, output selecting circuits 80 to 83 receive selection control signals B0 to B3, respectively. Output signals from output selecting circuits 80 to 83 are output to OUT lines O0 to O3, respectively.

Output selecting circuits 80 to 83 have the identical structure. Therefore, output selecting circuit 80 will be described as a representative.

Output selecting circuit 80 includes switches 801 to 809 and a latch circuit 810 applying a control signal to these switches. Read data DRa to DRh are output to OUT line O0 through switches 801 to 808, respectively. The empty cell information provided from empty cell register 84 is provided to OUT line O0 through switch 809.

Latch circuit 810 receives selection control signal B0, clock signal CLK and trigger signal TRG. Latch circuit 810 operates based on the clock signal CLK, and at a timing defined by trigger signal TRG, sets the control signal responsive to the selection control signal B0 to the H level. In this case, the switch for providing the read data from the buffer memory indicated by the selection control signal B0 is turned on.

Consequently, any of the cells represented by read data DRa to DRh or empty cell information from the empty cell register 84 is provided from output selecting circuit 80 to OUT line O0. Similarly, any of the cells represented by read data DRa to DRh or the empty cell information from empty cell register 84 is output to OUT lines O1 to O3 from output selecting circuits 81 to 83, respectively.

The overall operation of the unit switch shown in FIGS. 13 to 16 will be described with reference to the relation between the input and output signals in control circuit C4.

Figure 17:
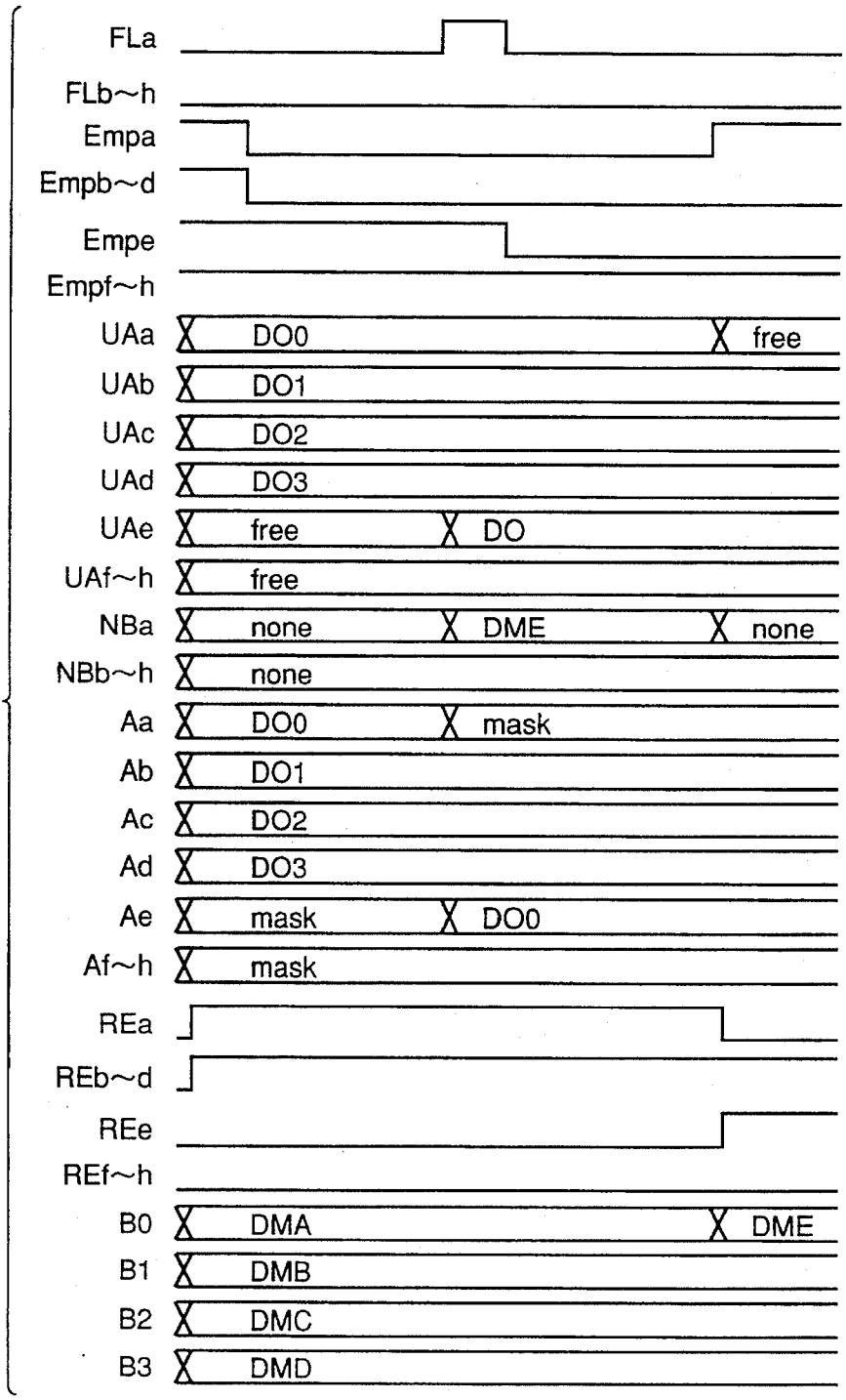
FIG. 17 is a timing chart showing operation of the control circuit shown in FIG. 14.

FIG. 17 is a timing chart showing the operation of control circuit C4.

(1) Normal operation

Referring to FIG. 17, in the normal operation, buffer memories MA to MD correspond to OUT lines O0 to O3, respectively. In this case, full signals FLa to FLh, empty signals Emp to Empd and read enable signals REe to REh are at the L level, respectively, and empty signals Empe to Emph as well as read enable signals REa to REh are at the H level. The allocation control signals UAa to UAd are the data DO0 to DO3, indicating OUT lines O0 to O3, respectively.

Address control signals Aa to Ad are also data DO0 to DO3, indicating OUT lines O0 to O3, respectively. Further, selection control signals B0 to B3 are data DMA to DMD indicating buffer memories MA to MD, respectively.

Thus, variable address filters FA to FD fetch cells corresponding to OUT lines O0 to O3, respectively. Each of the buffer memories MA to MD writes and reads cells. Selector S provides cells read from buffer memories MA to MD to OUT lines O0 to O3, respectively.

(2) When buffer memory MA becomes full

When the buffer memory MA becomes full from the normal state described above, the full signal FLa rises to the H level. In response, allotted OUT line number UAe changes to DO0 representing OUT line O0, and next buffer number NBa changes to data DME representing buffer memory ME. At the same time, the data of address control signal Aa ceases from representing OUT line O0, while data of address control signal Ae comes to represent OUT line O0.

Consequently, fetching of the cells from variable address filter FA is stopped, and fetching of the cells having OUT line O0 as the destination from variable address filter FE starts. Thus cells having OUT line O0 as the destination come to be written in buffer memory ME.

In this state, reading of cells from buffer memory MA continues, and selector S provides the cell read from buffer memory MA to OUT line O0. Meanwhile, reading of cells from buffer memory ME has not yet been started.

Thereafter, in buffer memory MA, only the reading of cells takes place, and therefore the full signal FLa eventually falls to the L level. In buffer memory ME, since writing of the cells is performed, empty signal Empe falls to the L level.

(3) When buffer memory MA becomes empty

When reading of the cells from buffer memory MA continues in the above described manner, buffer memory MA becomes empty, and empty signal Empa rises to the H level.

In response, the data of allotted OUT line number UAa no longer represents OUT line O0, and data of the next buffer number NBa no longer represents buffer memory ME. In response, read enable signal REa falls to the L level, and read enable signal REe rises to the H level.

The data of selection control signal B0 changes from that representing buffer memory MA to that representing buffer memory ME. Consequently, reading of the cells from buffer memory MA is stopped, and buffer memory MA is switched to the standby state. Accordingly, reading of the cells from buffer memory ME starts, and selector S provides the cells read from buffer memory ME to OUT line O0.

More specifically, variable address filter FE and buffer memory ME process the cells having OUT line O0 as the destination, in place of variable address filter FA and buffer memory MA.

As described above, in the unit switch shown in FIG. 13, the buffer memory which has become full, is set to the standby state when it becomes empty thereafter, and used as a spare buffer memory. Therefore, this buffer memory which serves as a spare buffer memory can quickly correspond to other OUT line of whose buffer memory is full.

Further, different from the unit switch shown in FIG. 10, it is not necessary to transfer cells between buffer memories and hence the number of writing and reading can be reduced. Accordingly, as compared with the unit switch of FIG. 10, power consumption can be reduced.

Further, in the buffer memory, efficiency of use of the hardware can be increased when the capacity of the memory is decreased and the number is increased. In that case, since the capacity of each buffer memory is smaller than that of the first to third embodiments, the increase in scale of the hardware can be avoided.

Fifth Embodiment

A fifth embodiment will be described. In the fifth and the following embodiments, a unit switch of a common buffer type ATM switch will be described.

Figure 18:
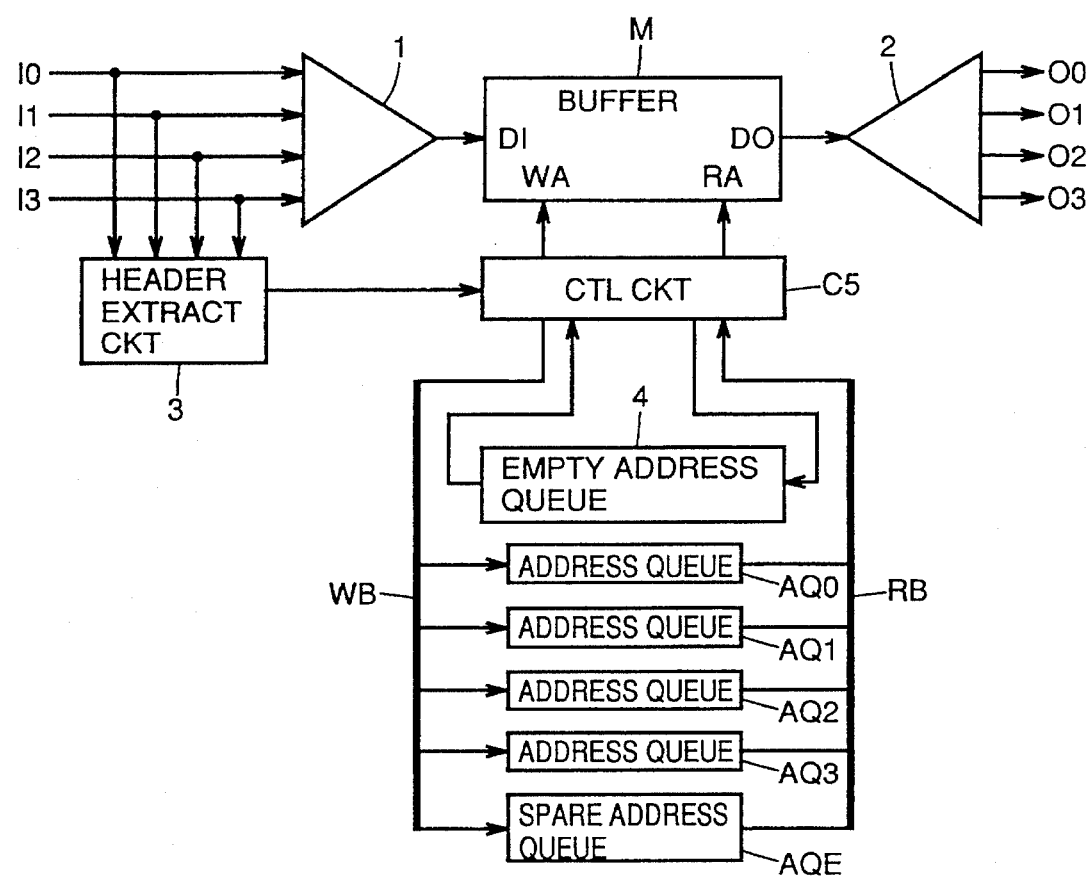
FIG. 18 is a block diagram showing a schematic structure of a unit switch in accordance with a fifth embodiment.

FIG. 18 is a block diagram showing a schematic structure of a unit switch in accordance with the fifth embodiment.

Figure 38:
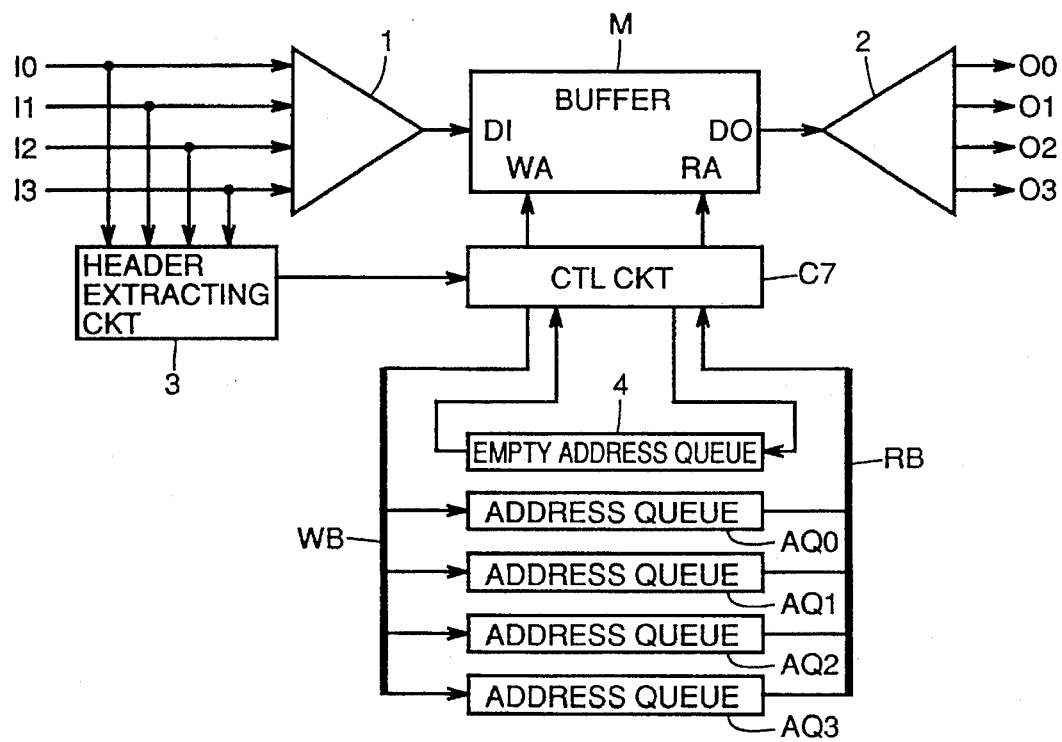
FIG. 38 is a block diagram showing a structure of a conventional common buffer type ATM switch.

The unit switch of FIG. 18 differs from that of FIG. 38 in the following point. Between write data bus WB and read data bus RB, a spare address queue AQE is added. Accordingly, the method of controlling the address queue in control circuit C5 is also different from that of FIG. 38. Further, the capacity of each of the address queues AQ0 to AQ3 of FIG. 18 is one half that of FIG. 38.

In this unit switch, when any of the address queues AQ0 to AQ3 becomes full, the spare address queue AQE stores the write address WA in place of the address queue which is full.

Figure 19:
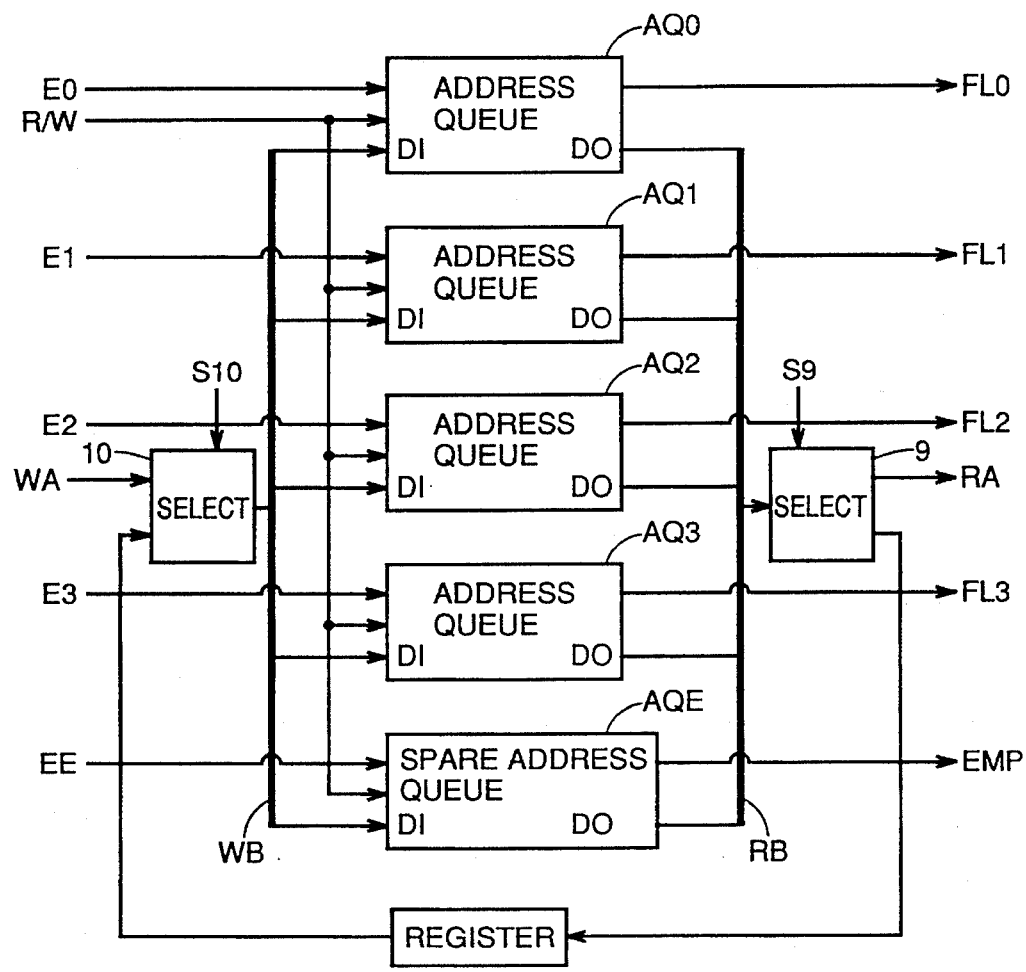
FIG. 19 is a block diagram showing a detailed manner of connection of an address queue and a spare address queue of FIG. 18.

FIG. 19 is an illustration showing detailed connection between address queues AQ0 to AQ3 and spare address queue AQE.

Referring to FIG. 19, address queues AQ0 to AQ3 receive enable signals E0 to E3 from control circuit C5, and receives a common read write control signals R/W from control circuit C5. Each of the address queues AQ0 to AQ3 receive the write address WA as input data DI, from write data bus WB.

Address queues AQ0 to AQ3 apply full signals FL0 to FL3 to control circuit C5. The full signals FL0 to FL3 are signals indicating whether the address queue is full or not. Address queues AQ0 to AQ3 each apply the read data DO to read data bus RB.

Spare address queue AQE receives enable signal EE and read write control signal R/W from control circuit C5, and also receives write address WA as input data DI from write data bus WB. Spare address queue AQE applies empty signal EMP to control circuit C5, and applies the read data DO to read data bus RB. Here, the empty signal EMP is a signal indicating whether the spare address queue AQE becomes empty or not.

A selector 9 receives data DO from read data bus RB, and selectively applies the data to control circuit C5 and register RG, in response to a control signal SQ applied from control circuit C5. More specifically, in the state when data DO are provided from address queues AQ0 to AQ3, it selects the output to control circuit C5, and in a state in which data DO is provided from spare address queue AQE, it selects an output to register RG.

Register RG successively stores the data applied from selector 9, and successively applies the stored data to selector 10.

Selector 10 receives, in addition to the data from register RG, write address WA from control circuit C5, selects one of the input two data in response to the control signal S10 from control circuit C5, and applies the selected data to write data bus WB. Consequently, the data read from spare address queue AQE comes to be applied to write data bus WB through read data bus RB, selector 9, register RG and selector 10.

The operation of the unit switch shown in FIGS. 18 and 19 will be described.

Prior to the description, the relation between the states of enable signal and read write control signal in address queues AQ0 to AQ3 and spare address queues AQE shown in FIG. 19 and operation mode will be described. FIG. 20 shows, in a table, the relation between the states of enable signal and read write control signal and operation mode.

Referring to FIG. 20, when enable signals E0 to EE are at the "1", the corresponding address queue is set to the operating state. The read write control signal selects write state when it is "1", and it selects read state when it is "0".

Accordingly, each of the address queues AQ0 to AQ3 and spare address queue AQE is set to the write operation mode when the corresponding enable signal is "1" and the read write control signal R/W is "1", while it is set to the read operation mode when the corresponding enable signal is "1" and the read write control signal R/W is at "0".

The operation of the unit switch will be described with reference to FIGS. 18 and 19. In this unit switch, the normal operation from the start until any of the address queues AQ0 to AQ3 becomes full is the same as the conventional one shown in FIG. 38. Therefore, description thereof is not repeated.

Assume that during such a normal operation, the address queue AQ0 corresponding to OUT line O0 becomes full, for example. In that case, the full signal FL0 attains to the prescribed level. In response to the change of the full signal FL0, the spare address queue AQE is allotted as the address queue corresponding to the OUT line O0. The control is performed based on the enable signal EE and read write control signal R/W.

Consequently, the write address WA corresponding to OUT line O0 is written to spare address queue AQE. Meanwhile, the read address RA corresponding to OUT line O0 is read from address queue AQ0.

When one read address RA is read from address queue AQ0 in this state, one address is read from spare address queue AQE, and it is written to address queue AQ0 through read data bus RB, selector 9, register RG, selector 10 and write data bus WB. Such transfer of the address is repeated until the spare address queue AQE becomes empty.

When the spare address queue AQE becomes empty by such continuous operation, the empty signal EMP changes to the prescribed level. In response, allotment OUT line O0 to spare address queue AQE is canceled. As a result, the normal operation is presumed.

Such allotment of the spare address queue AQE to the OUT line is carried out corresponding to every address queue AQ0 to AQ3.

The control of spare address queue AQE performed in control circuit C5 will be described, separately referring to the allocation control of spare address queue AQE and allotment canceling control of spare address queue AQE.

Figure 21:
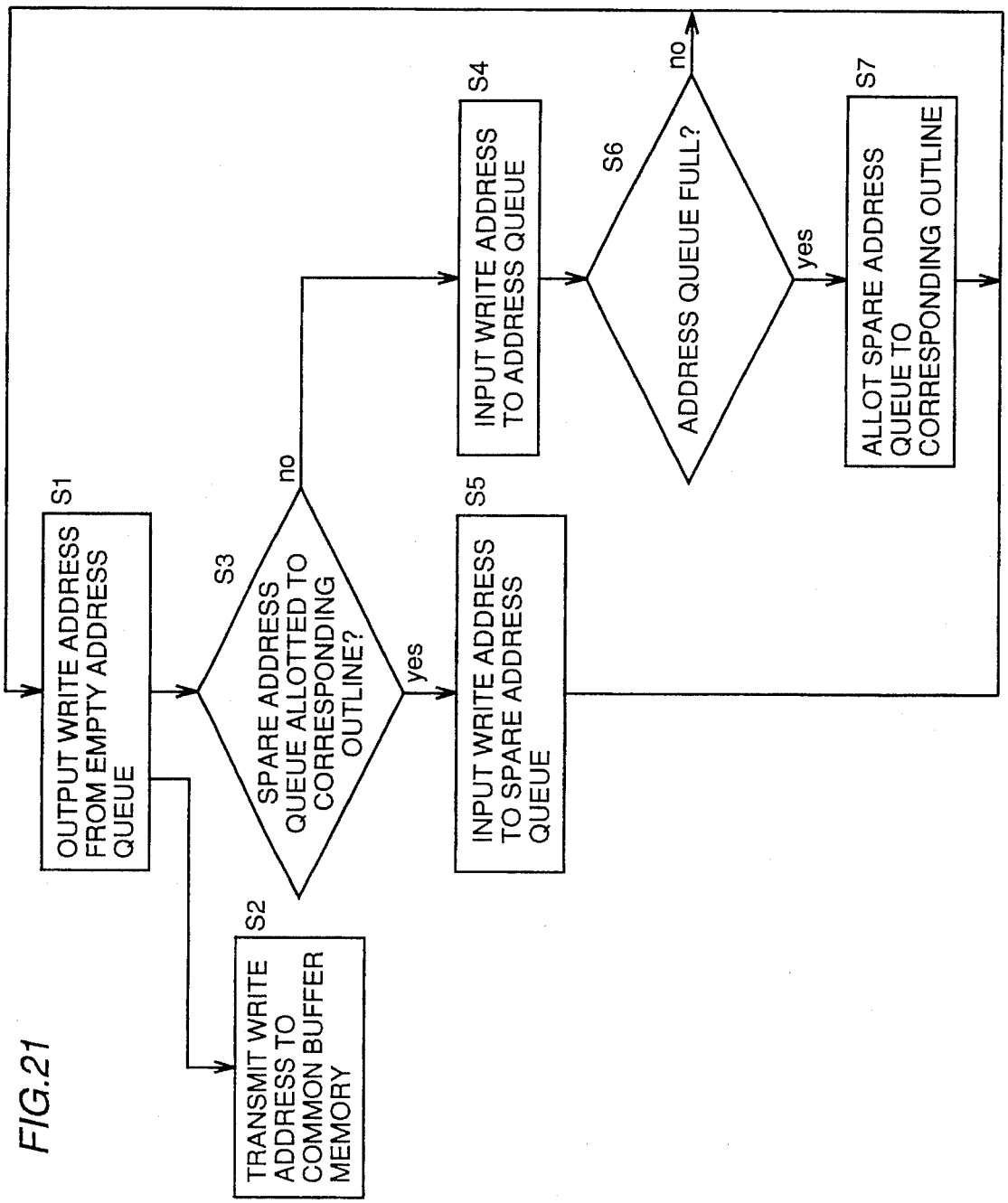
FIG. 21 is a flow chart showing allocation control of a spare address queue.

First, allocation control of spare address queue AQE will be described. FIG. 21 is a flow chart showing the allocation control of spare address queue AQE.

Referring to FIG. 21, at first, in step S1, write address WA is provided from empty address queue 4. In step S2, write address WA is transmitted from control circuit C5 to common buffer memory M. In step S3, whether or not the spare address queue AQE is allotted to the OUT line corresponding to write address WA is determined.

When it is determined in step S3 that the spare address queue is not allotted, the write address WA is input to the corresponding address queue in step S4. Meanwhile, when it is determined in step S3 that the spare address queue AQE is allotted, the write address WA is input to the spare address queue AQE in step 5.

After step S4, whether the address queue storing the write address WA has become full or not is determined in step S6. If it is determined in step S6 that it becomes full, the spare address queue AQE is allotted to the OUT line to which said full address queue corresponds, in step S7. Meanwhile, if it is determined in step S6 that it is not full, the flow returns to step S1. The flow also returns to step S1 after the completion of step S5 or S7.

Allotment canceling control of spare address queue AQE will be described.

Figure 22:
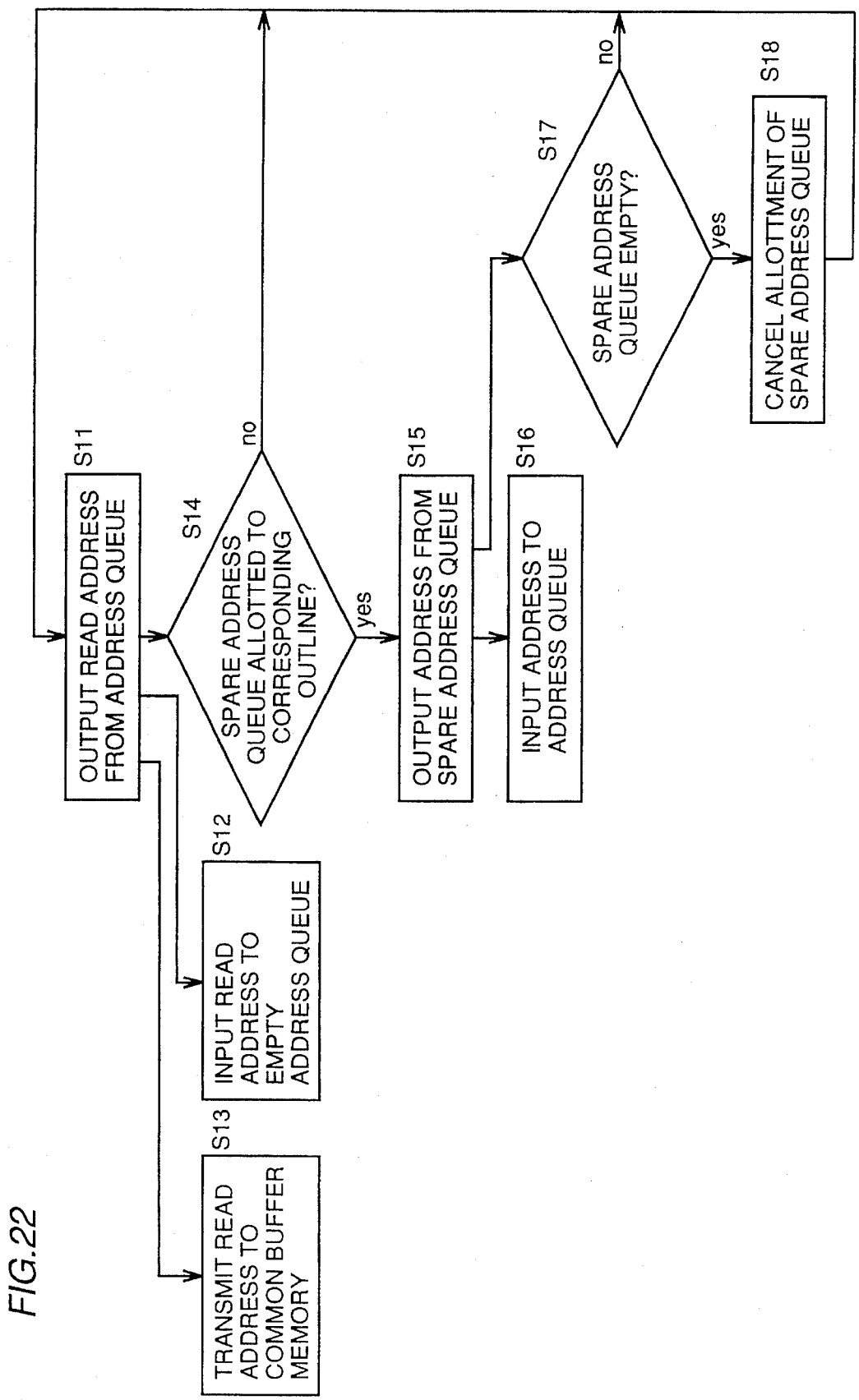
FIG. 22 is a flow chart showing allocation cancel control of the spare address queue.

FIG. 22 is a flow chart showing the allotment canceling control of spare address queue AQE.

Referring to FIG. 22, in step S11, read address RA is output from a specific address queue. In step S12, the read address RA is input to empty address queue 4, and in step S13, read address RA is transmitted to common buffer memory M. In step S14, whether the spare address queue AQE is allotted to the OUT line which corresponds to the specific address queue is determined.

If it is determined in step S14 that the spare address queue AQE is not allotted, then the flow returns to step S11. Meanwhile, if it is determined in step S14 that the spare address queue AQE is allotted, the address is output from spare address queue AQE in step S15.

In step S16, the address output from spare address queue AQE is input to said specific address queue. In step S17, whether or not the spare address queue AQE has become empty is determined.

If the spare address queue AQE has not yet made empty, the flow returns to step S11. Meanwhile, if it is determined in step S17 that the spare address queue AQE has become empty, allotment of the spare address queue AQE is canceled in step S18.

The read timing and write timing of the address queues AQ0 to AQ3 and spare address queue AQE shown in FIG. 19 will be described. Here, the operation timing in 1 ATM cell cycle, which corresponds to 1 cycle of writing of the cell arrived at IN lines I0 to I3 and reading of the cell to OUT lines O0 to O3 in the unit switch will be described.

Figure 23:
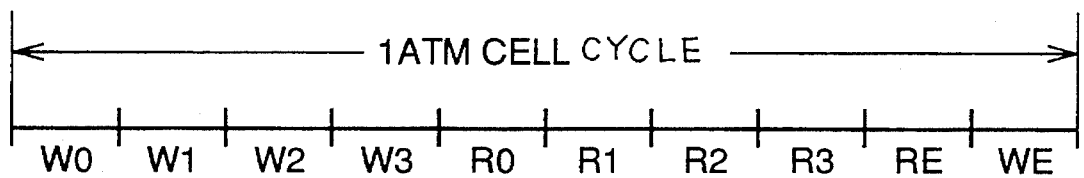
FIG. 23 is a timing chart showing operation timings of the address queue of the unit switch in accordance with the embodiment.

FIG. 23 is a timing chart showing operation timings of the address queues AQ0 to AQ3 and spare address queue AQE. Referring to FIG. 23, in 1 ATM cell cycle, first, operations W0 to W3 are effected in which write address WA of the cells arrived at IN lines I0 to I3 are input to the address queues AQ0 to AQ3 or spare address queue AQE corresponding to the destination OUT line. Thereafter, operations R0 to R3 are performed in which read address RA to be output to OUT lines O0 to O3 are provided from address queues AQ0 to AQ3.

An operation RE in which an address is provided from spare address queue AQE and fetched in register RG, and an operation WE in which the address is fetched from register RG and input to the corresponding address queue, are successively performed.

In the manner of connection shown in FIG. 19, data lines on the input and output sides of the address queues AQ0 to AQ3 and spare address queue AQE are in the form of busses, and therefore 1 ATM cell cycle is divided into 10 and respective operations are performed successively, as described above.

In such 1 ATM cell cycle, selector 10 selects write address WA from control circuit C5 and applies the same to write data bus WB in the period of operations W0 to W3, while it selects the address from register RG and applies the same to write data bus WB in the period of operation WE. Selector 9 applies the address from read data bus RB as read address RA to control circuit C5 during the periods of operations R0 to R3, and applies the address from read data bus RB to register RG in the period of operation RE.

Though one spare address queue AQE is provided in the fifth embodiment, the number is not limited and a plurality of spare address queues AQE may be provided.

The memory capacity of each of the common buffer memory M, empty address queue 4 and address queues AQ0 to AQ3+spare address queue AQE will be described. FIG. 24 shows, in a table, memory capacity of the unit switch in accordance with the fifth embodiment.

Referring to FIG. 24, three different memory capacities of common buffer memory, empty address queue and OUT line address queues+spare address queue are shown. As for the capacity of the OUT line address queues+spare address queue, the capacity when the reduction ratio of the address queue with respect to the capacity of the address queue used in the conventional unit switch is 1, ½ and 1/L are shown respectively. Here, the reduction ratio of 1 corresponds to the prior art, and reduction ratio of ½ corresponds to the present embodiment.

The memory capacity in each of the common buffer memory and empty address queue is represented by bit width×word length. The memory capacity of the address queues+spare address queue is represented by the result of multiplication of the number of address queues+spare address queue, bit width and word length.

When the memory capacity of the common buffer memory is sufficient to write 512 cells, the empty address queue must have the capacity of 512 addresses. Therefore, in the conventional unit switch, the capacity of the address queue needs to be 512 addresses. By contrast, in the fifth embodiment, the capacity of the address queue is reduced to ½, and one spare address queue is provided. The reason for this is that the total number of addresses in the common buffer memory is fixed and when the addresses corresponding to a certain OUT line occupies more than ½ of the addresses of the common buffer memory, the addresses corresponding to other OUT lines is inevitably smaller than ½.

As is apparent from FIG. 24, the total capacity of the OUT line address queues and spare address queue in the fifth embodiment is 11.5 Kbit, and therefore the capacity can be significantly reduced from the conventional capacity of 18.4 Kbit. The effect of reduction of the memory capacity is more conspicuous as the switch size (number of inputs×number of outputs) is larger.

Now, handling of broadcast cells by the unit switch shown in FIGS. 18 and 19 will be described. The broadcast cell refers to a cell having a plurality of destinations. In such a case, the address of the input cell is copied corresponding to the number of destination OUT lines, and stored in a plurality of address queues. Therefore, it is possible that the total number of addresses stored in the OUT line address queues AQ0 to AQ3 and spare address queue AQE exceeds the number of addresses of the common buffer.

Therefore, when a broadcast cell is to be handled, the capacity of the address queues is made larger than M/L, taking into consideration the probability of generation of the broadcast cell. Alternatively, at least L spare address queues may be provided. Here, 1/L represents the aforementioned reduction ratio, and M represents the number of cells.

The reason why the number and capacity of the spare address queues are increased will be described. Assume that the probability of generation of the broadcast cell is p, there would be p·M broadcast cells among M cells which can be written to the common buffer memory M. For simplicity of description, let us assume that the number of destination OUT lines of every broadcast cell is N, that is, every broadcast cell are output to all the OUT lines.

When the common buffer memory M becomes full, the number of addresses stored in the address queue is as follows. Number of addresses of the cells other than the broadcast cells is (1−p)M, the number of addresses of the broadcast cells is p·M·N, and therefore the number of addresses is M+p·M(N−1) in total. More specifically, if broadcast cells are generated at the probability of p, the number of addresses would be increased by 100p(N−1)%. Therefore, the capacity of each address queue should be increased by 100p(N−1)%. Alternatively, the number of spare address queue may be increased so as to compensate for the increase in the number of addresses.

Sixth Embodiment

A sixth embodiment will be described. In the sixth embodiment, other example of the manner of connection of the address queues AQ0 to AQ3 and spare address queue AQE will be described.

Figure 25:
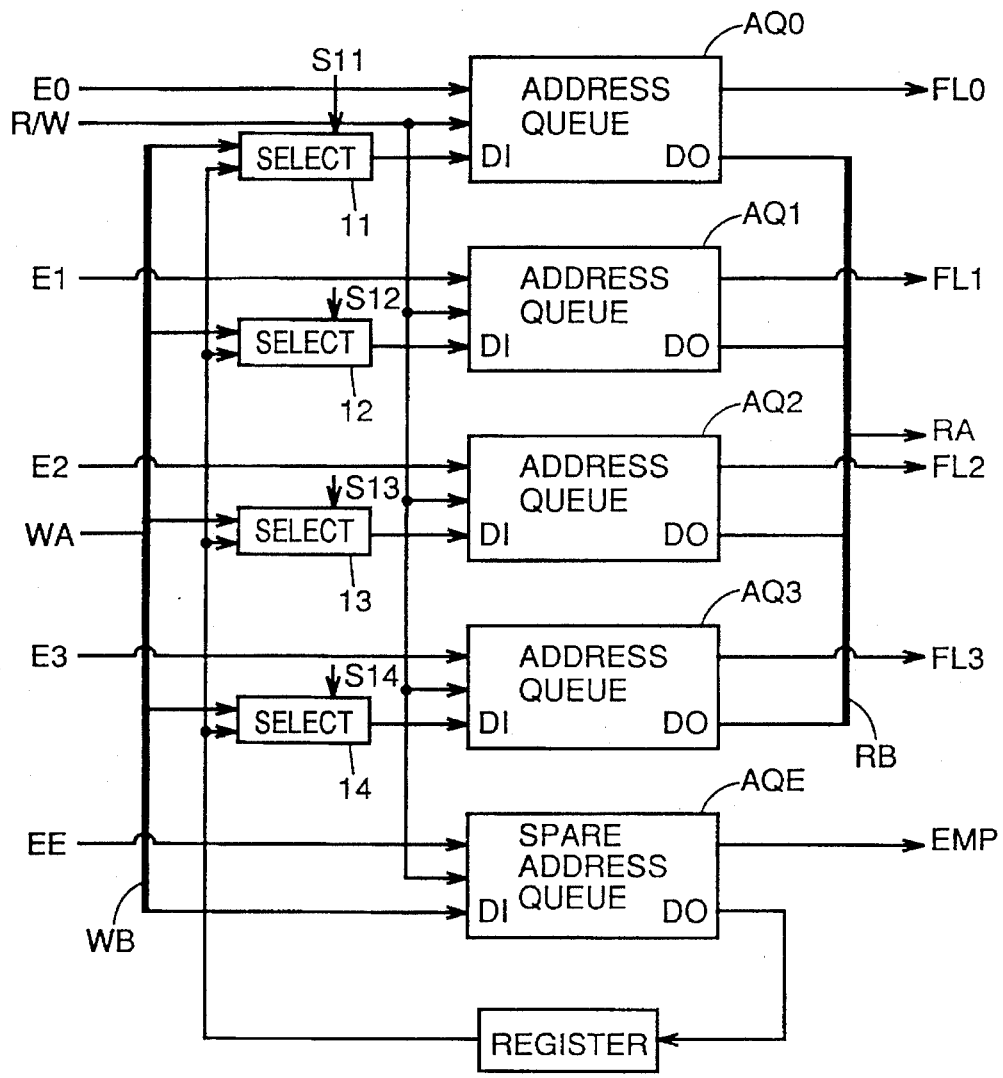
FIG. 25 is a block diagram showing manner of connection of the address queue and the spare address queue of the unit switch in accordance with a sixth embodiment.

FIG. 25 is a block diagram showing the manner of connection of the address queues and the spare address queues of the unit switch in accordance with the sixth embodiment.

The manner of connection shown in FIG. 25 differs from that of FIG. 19 in the following points. The selector is not provided on the output side of read data bus RB or the input side of write data bus WB, but selectors 11 to 14 are provided between write data bus WB and address queues AQ0 to AQ3, respectively. Spare address queue AQE is not connected to read data bus RB but directly connected to register RG. These are the main differences.

More specifically, the example of FIG. 25 is connected in the following manner. The data DO output from spare address queue AQE is applied to selectors 11 to 14 through register RG. Each of the selectors 11 to 14 receives write address WA from write data bus WB, and receives control signals S11 to S14 from control circuit C5. Each of the selectors 11 to 14 selectively applies the write address WA from write data bus WB and address from the register RG, as the data DI to a corresponding address queue, in response to the applied control signals.

When the corresponding address queue is full, respective ones of the selectors 11 to 14 selects and outputs the address from register RG, and if the corresponding address queue is not full, selects and outputs the write address WA from write data bus WB.

In this manner, the address applied from the spare address queue AQE to the address queue which has become full is provided not through the read data bus RB or write data bus WB.

Figure 26:
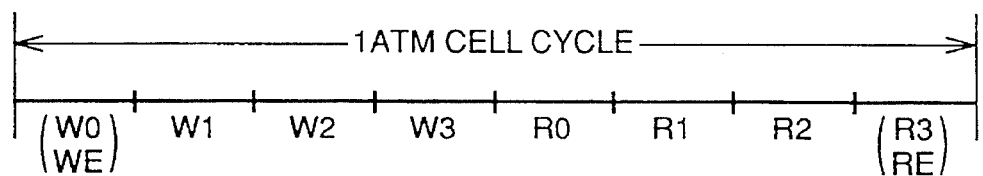
FIG. 26 is a timing chart showing operation timings of the address queue of the unit switch in accordance with the sixth embodiment.

The operation cycle of the address queues AQ0 to AQ3 and spare address queue AQE connected in the manner as shown in FIG. 25 will be described. FIG. 26 is a timing chart showing operation timings of the address queues in the unit switch in accordance with the sixth embodiment.

The operation cycle of FIG. 26 differs from that of FIG. 23 in that the operation WE for fetching the address from the register RG and inputting the same to the corresponding address queue is performed simultaneously with the operation W0, and that the operation RE for providing an address from spare address queue AQE and fetching the same in register RG is performed simultaneously with the operation R3. Therefore, transfer of the address from the spare address queue AQE to the address queue which is full can be carried out without reducing the access cycle to the address queues AQ0 to AQ3.

Seventh Embodiment

The seventh embodiment will be described. In this seventh embodiment also, other example of the manner of connection of the address queues and the spare address queue shown in FIG. 19 will be described.

Figure 27:
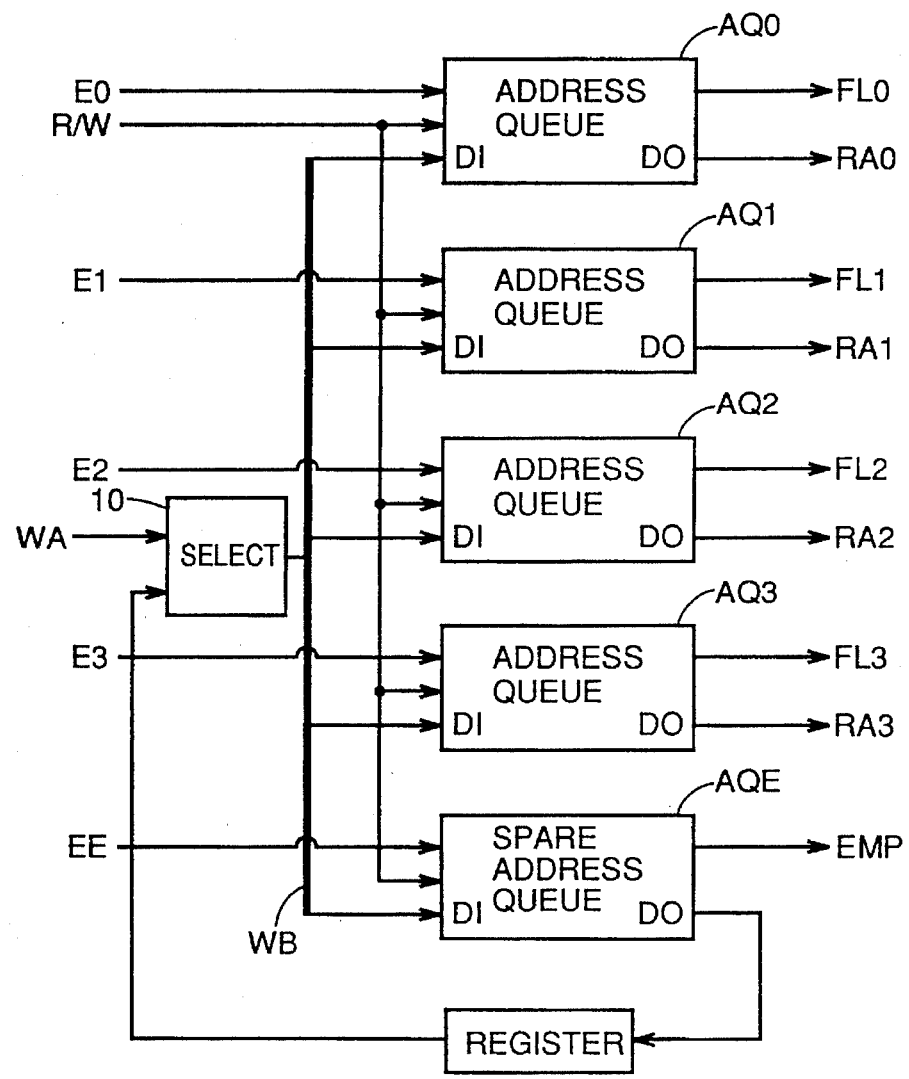
FIG. 27 is a block diagram showing a manner of connection of the address queue and the spare address queue of the unit switch in accordance with a seventh embodiment.

FIG. 27 is a block diagram showing the manner of connection of the address queues and the spare address queue in accordance with the seventh embodiment.

Referring to FIG. 27, the manner of connection of the address queues AQ0 to AQ3 and spare address queue AQE of FIG. 27 differs from that of FIG. 19 in the following points. Namely, the read data bus and the selectors are not provided on the output side of the address queues AQ0 to AQ3 and spare address queue AQE. The data provided from address queues AQ0 to AQ3 are directly applied to control circuit C5 as read addresses RA0 to RA3. Meanwhile, the address provided from spare address queue AQE is directly applied to register RG.

In the unit switch having the address queues AQ0 to AQ3 and the spare address queue AQE connected in such a manner as shown in FIG. 27, read addresses can be simultaneously applied to control circuit C5 from address queues AQ0 to AQ3 as the read data bus is not provided, and further it is not necessary to provide a selector.

Figure 28:
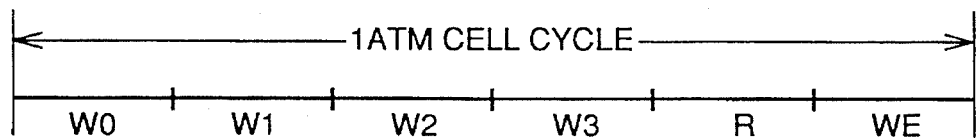
FIG. 28 is a timing chart showing operation timings of the address queue of the unit switch in accordance with the seventh embodiment.

The operation cycle of the address queues AQ0 to AQ3 and the spare address queue AQE connected in the manner as shown in FIG. 27 will be described. FIG. 28 is a timing chart showing the operation timings of the address queues in the unit switch in accordance with the seventh embodiment.

The operation cycle of FIG. 28 differs from that of FIG. 23 in that output operations R0 to R3 shown in FIG. 23 and output operation RE of the address applied to register RG are performed in one output operation R. Therefore, the number of operations in one ATM cell cycle can be reduced.

Eighth Embodiment

An eighth embodiment will be described. In the eighth embodiment also, another example of the manner of connection of the address queues AQ0 to AQ3 and a spare address queue AQE will be described, as in the sixth and seventh embodiments.

Figure 29:
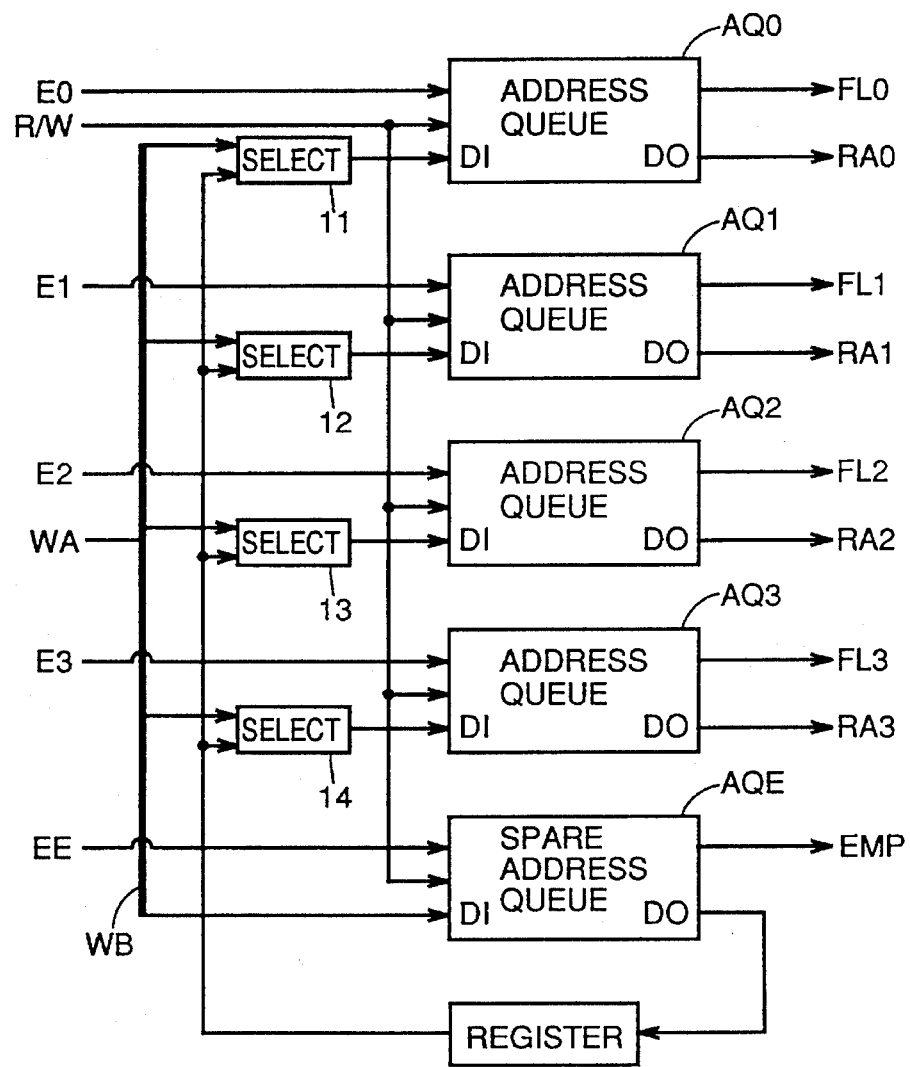
FIG. 29 is a block diagram showing the manner of connection of the address queue and the spare address queue of a unit switch in an eighth embodiment.

FIG. 29 is a block diagram showing the manner of connection of the address queues and the spare address queue of the eighth embodiment.

The manner of connection of FIG. 29 differs from that of FIG. 25 in that the read data bus is not provided on the output side of the address queues AQ0 to AQ3. The data provided from address queues AQ0 to AQ3 are directly applied to control circuit C5 as read addresses RA0 to RA3. These are the differences over the example of FIG. 25.

The operation timing of address queues AQ0 to AQ3 and spare address queue AQE connected in the manner as shown in FIG. 29 will be described.

Figure 30:
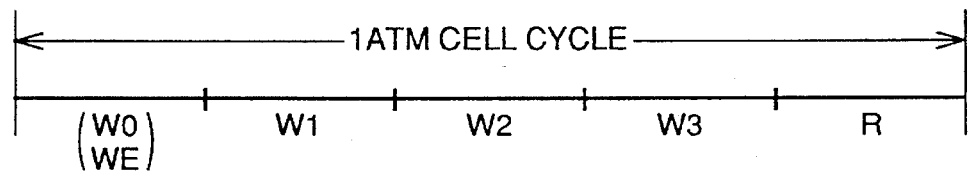
FIG. 30 is a timing chart showing operation timings of the address queue of the unit switch in accordance with the eighth embodiment.

FIG. 30 is a timing chart showing the operation timing of the address queues in the unit switch in accordance with the eighth embodiment.

The operation cycle of FIG. 30 differs from that of FIG. 26 in that the output operations R0 to R3 shown in FIG. 26 and output operation RE of the address to be applied to register RG are performed in one output operation R. The reason for this is that the read data bus is not provided on the output side of address queues AQ0 to AQ3.

Ninth Embodiment

A ninth embodiment will be described. In the ninth embodiment, not a plurality of address queues but one address queue having large capacity is provided.

Figure 31:
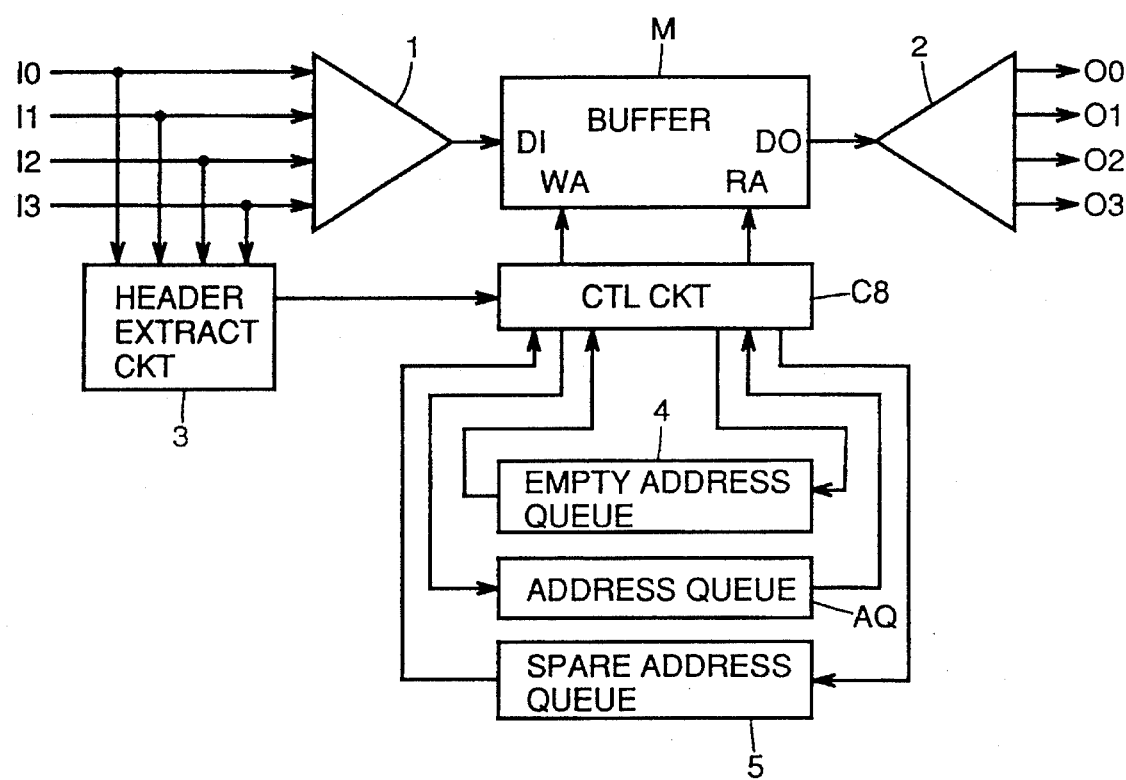
FIG. 31 is a block diagram showing a structure of a unit switch in accordance with a ninth embodiment.

FIG. 31 is a block diagram showing the structure of a unit switch in accordance with the ninth embodiment.

The unit switch of FIG. 31 differs from that of FIG. 18 in that write data bus WB, read data bus RB, a plurality of address queues AQ0 to AQ3 and spare address queue AQE are not provided, but one address queue AQ and a spare address queue 5 are provided. In addition, control circuit C8 has a different function.

Address queue AQ receives as an input the write address WA from control circuit C8, outputs the stored address and applies the same to control circuit C8 as read address RA. Empty address queue 5 receives an empty address of address queue AQ from control circuit C8 as an input, outputs the stored address, and applies the same to control circuit C8.

Figure 32:
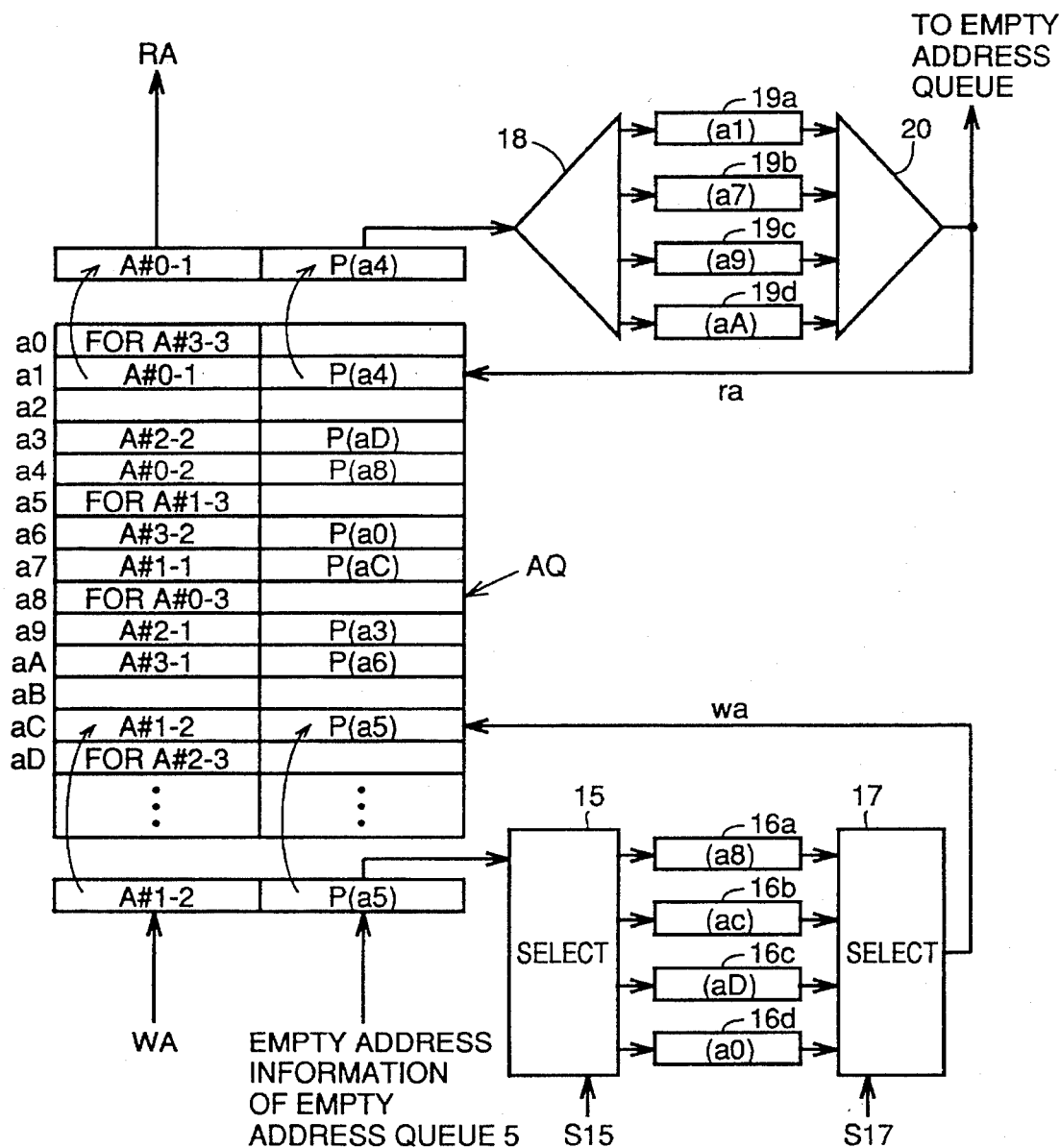
FIG. 32 is a block diagram showing a structure of a part of the control circuit and the address queue in a unit switch in accordance with the ninth embodiment.

The address queue AQ and the portion controlling the address queue AQ in the control circuit C8 in the unit switch of FIG. 31 will be described in greater detail. FIG. 32 is a block diagram showing the structure of a part of the control circuit C8 and the address queue of the unit switch in accordance with the ninth embodiment.

Referring to FIG. 32, the control circuit C8 shown in FIG. 31 includes a selector 15, write address registers 16a to 16d, a selector 17, a demultiplexer 18, read address registers 19a to 19d, and a multiplexer 20.

Between selectors 15 and 17, write address registers 16a to 16d are connected. Between demultiplexer 18 and multiplexer 20, read address registers 19a to 19d are connected.

Write address register 16a and read address register 19a correspond to OUT line O0, respectively. Write address register 16b and read address register 19b correspond to OUT line O1, respectively. Write address register 16c and read address register 19c correspond to OUT line O2, respectively. Write address register 16d and read address register 19d correspond to OUT line O3. Write address registers 16a to 16d and read address registers 19a to 19d handle information corresponding to respective OUT lines.

Selector 15 receives an empty address from empty address queue 5, and selectively applies the address to one of the write address registers 16a to 16d which corresponds to the OUT line, in response to the control signal S15 from control circuit C8. Each of the write address registers 16a to 16d holds one of the addresses applied from selector 15, and applies the address to selector 17.

Selector 17 selects the address applied from write address registers 16a to 16d in response to control signal S17 from control circuit C8, and applies the address as write address wa to address queue AQ. In address queue AQ, the write address WA provided from empty address queue 4 is written as address A, and empty address output from empty address queue 5 is written as pointer P, at the address indicated by the write address wa of the addresses a0 to aD . . . .

Demultiplexer 18 receives the address pointer read from address queue AQ, and selectively applies the address to one of the read address registers 19a to 19d which corresponds to the OUT line. Each of the read address registers 19a to 19d holds one address applied from demultiplexer 18, and applies the address to multiplexer 20. Multiplexer 20 applies the address applied from read address register 19a to 19d as empty address to empty address queue 5, and applies the same as read address ra to address queue AQ.

Figure 33:
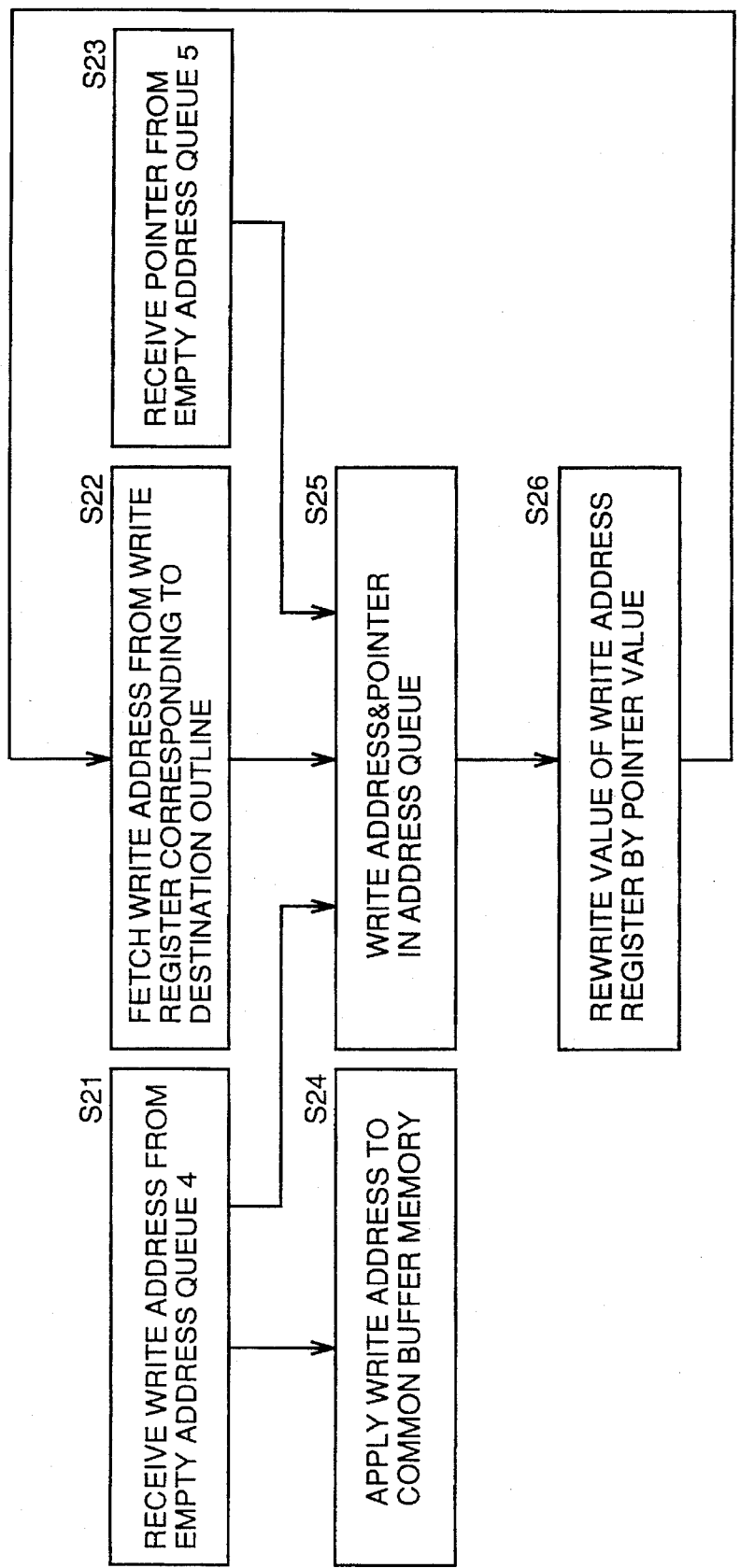
FIG. 33 is a flow chart showing an operation of writing an address to the address queue.
Figure 34:
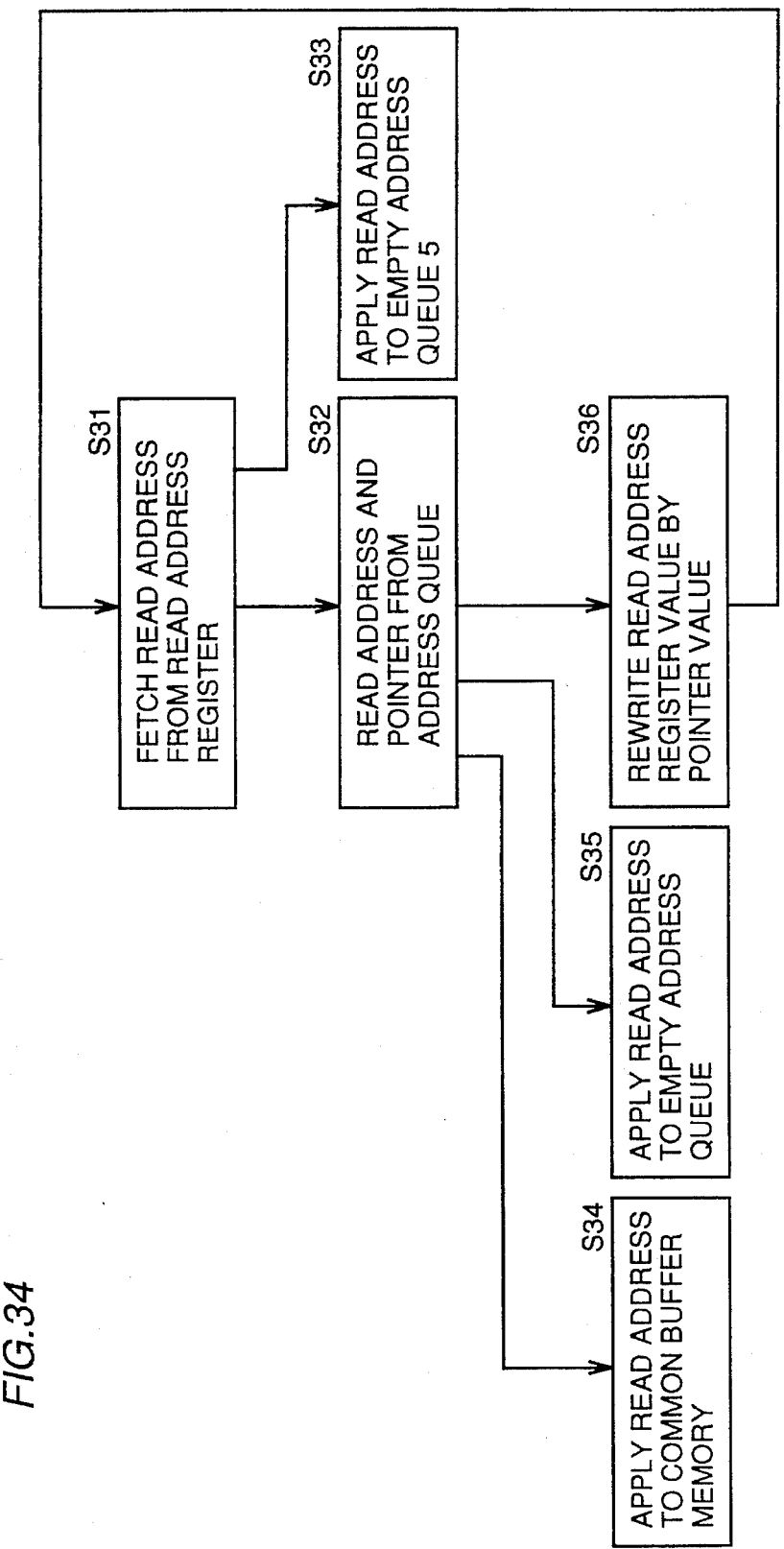
FIG. 34 is a flow chart showing an operation of reading an address from the address queue.

The operation of the circuit shown in FIG. 32 will be described. FIG. 33 is a flow chart showing the operation of writing an address to the address queue AQ. FIG. 34 is a flow chart showing the operation of reading the address from address queue AQ.

First, referring to FIGS. 32 and 33, the following control is performed by control circuit C8.

In step S21, the empty address of common buffer memory M is received as write address WA from empty address queue 4. At the same time, in step S22, address of the write address register corresponding to OUT line of the destination of the cell to be written among write address registers 16a to 16d is fetched as write address wa related to the address queue AQ. Further, at the same time, in step S23, the empty address of address queue AQ is received as pointer P from empty address queue 5.

In step S24, write address WA is applied to common buffer memory M. In step S25, the address A and the pointer P indicated by write address WA are written to write address wa for address queue AQ.

In step S26, the values of the write address register from which the address is fetched, is replaced by the value of pointer P written in address queue AQ in step S25.

In this manner, a pointer chain is formed corresponding to each OUT line, in which addresses A of the cell corresponding to each OUT line are connected successively by the pointer P. Therefore, in this embodiment, not a plurality of address queues but only one address queue is required.

Referring to FIGS. 32 and 34, control of reading of the address from common buffer memory M and address queue AQ performed in the control circuit C8 will be described.

In step S31, an address is fetched as read address ra with respect to address queue AQ, from one of the read address registers 19a to 19d. This operation is carried out in a prescribed order with respect to the read address registers 19a to 19d.

In step S32, read address ra read in step S31 is read for address queue AQ. The address A serves as read address RA. In step S33, the read address ra is applied to empty address queue 5.

Next, steps S34, S35 and S36 are performed parallel to each other. In step S34, the read address RA is applied to common buffer memory M. In step S35, the read address RA is applied to empty address queue 4. In step S36, the value of the register from which the address is fetched, is replaced by the value of the pointer P read in step S32.

By the repetition of such control, read address information RA is read successively.

The operation for handling a broadcast cell in the unit switch shown in FIG. 31 will be described. Since the broadcast cell has a plurality of destinations, when the broadcast cell is input through IN lines I0 to I3, the write address WA for writing the broadcast cell to common buffer memory M is written in a plurality of addresses of address queue AQ. Therefore, the number of addresses used in address queue AQ becomes larger than the number of addresses used in the common buffer memory M.

Therefore, when the depths of address queue AQ is equal to the total number of addresses of common buffer memory M, it is possible that the address queue AQ becomes full by the input of a broadcast cell, resulting in disposal of the cells. Therefore, when a broadcast cell is to be handled, the depth of address queue AQ is made deeper than the total number of addresses of the common buffer memory M, taking into consideration the probability of generation of the broadcast cells. By doing so, disposal of the cells caused by the handling of broadcast cells can be prevented.

The operation timing of the address queue of the unit switch shown in FIGS. 31 and 32 will be described.

Figure 35:
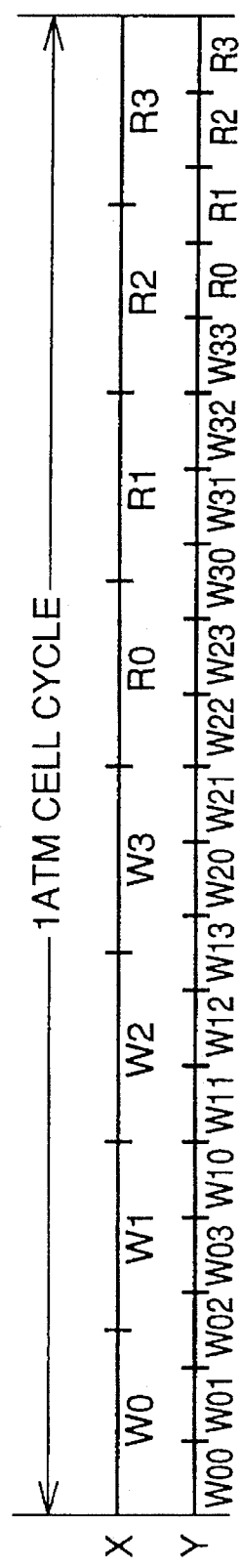
FIG. 35 is a timing chart showing operation timings of the address queue of the unit switch in accordance with the ninth embodiment.
Figure 37:
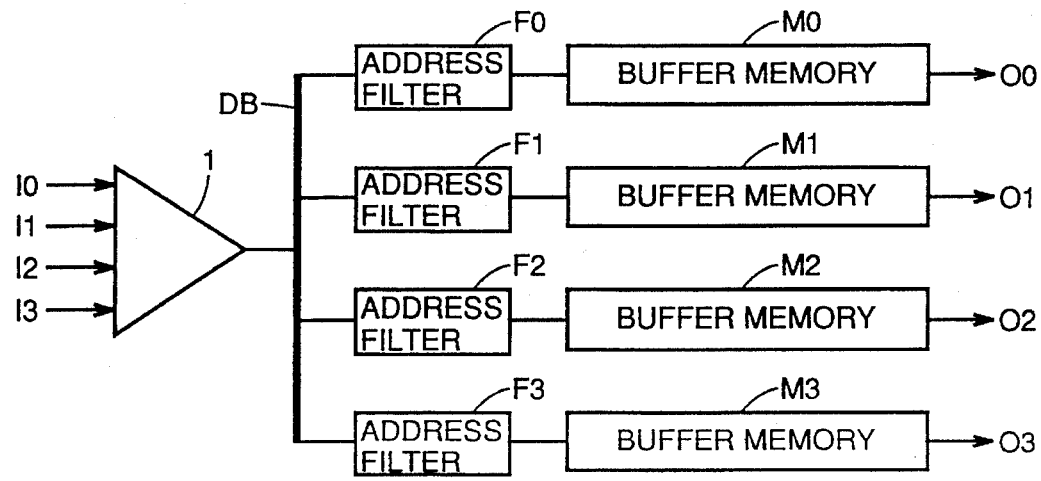
FIG. 37 is a block diagram showing a structure of a conventional output buffer type ATM switch.

FIG. 35 is a timing chart showing the operation timing of the address queue in the unit switch in accordance with the ninth embodiment. FIG. 35 shows timing when (X) a broadcast cell is not handled and (Y) a broadcast cell is handled.

In the case X when the broadcast cell is not handled, write operations W0 to W3 to address queue AQ and reading operations R0 to R3 from address queue AQ, that is, a total of 8 operations are necessary in 1 ATM cell cycle. Therefore, 1 ATM cell cycle is divided into 8.

In case Y when the broadcast cell is handled, it is possible that each of the broadcast cells input through IN line Ii (i=0 to 3) has all OUT lines Oj (j=0 to 3) as its destination. Therefore, write operation is represented by Wij.

In 1 ATM cell cycle, write operations W00 to W03, W10 to W13, W20 to W23 and W30 to W33, that is, a total of 16 operations are necessary for writing the broadcast cell. In that case, four reading operations R0 to R3 are necessary. Namely, a total of 20 operations are necessary in 1 ATM cell cycle. Therefore, 1 ATM cell cycle is divided into 20.

The memory capacity of the unit switch in accordance with the ninth embodiment and the memory capacity of the unit switch of the prior art will be compared.

FIG. 36 is a table showing comparison between the capacity of the unit switch in accordance with the ninth embodiment and the capacity of the conventional unit switch.

FIG. 36 shows memory capacities of a cell+pointer method and an address+pointer method. Here, the cell+pointer method refers to a method in which the pointer is written in the common buffer memory. This method has been conventionally known. The address+pointer method refers to a method in which the pointer is written in the address queue. This method corresponds to the unit switch of the ninth embodiment.

In FIG. 36, in the column A of the memory capacity, memory capacity when the broadcast cell is not handled are given, while in the column of memory capacity B, the memory capacity when the broadcast cells are handled are shown. The number of pointers when the broadcast cell is not handled is 512, while the numbers of pointers when broadcast cells are handled is 563, which is increased by 10%.

The memory capacity can be calculated by bit width (bit)×word length (word). The bit width of the common buffer memory in the cell+pointer method and the bit width of the address queue of the address+pointer method are obtained by adding the number of pointers, respectively.

As is apparent from FIG. 36, in the address+pointer method, the amount of increase of the memory capacity when the broadcast cells are handled is smaller as compared with the cell+pointer method. As a result, when the number of pointers is increased, the memory capacity is smaller than that of the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ATM switch for selectively outputting a plurality of cells input through a plurality of IN lines and each having individual destination information, to a plurality of OUT lines in accordance with destination information of each cell, comprising:

multiplying and outputting means for time-divisionally multiplying and outputting the plurality of cells input through said plurality of IN lines;

a plurality of first filter means, each being provided corresponding to each of said plurality of OUT lines for fetching a cell having the corresponding OUT line as destination information from the cells output from said multiplying and outputting means;

a plurality of first memory means, each being provided corresponding to each of said plurality of first filter mean to write the cell fetched by the corresponding first filter means and read the written cells;

second filter means for fetching a cell having the set destination information, from the cells output from said multiplying and outputting means, said second filter means being variable in accordance with the destination information;

second memory means for writing the cell fetched by said second filter means and for reading the written cells;

a plurality of selecting means, each being provided corresponding to each of said plurality of OUT line for providing the cell written in the first and second memory means to the corresponding OUT line;

filter control means for controlling set destination information of the cell to be fetched in said second filter means, in accordance with state of use of each of said plurality of first memory means; and selection control means for controlling state of selection of each of said selecting means in accordance with the state of use of each of said plurality of first memory means.

2. The ATM switch according to claim 1, wherein each of said plurality of first memory means and said second memory means is an FIFO memory.

3. The ATM switch according to claim 1, comprising a plurality of said second filter means and a plurality of said second memory means; wherein each of said plurality of selecting means is connected to one of said plurality of second memory means, said connected second memory means being an object of selection.

4. The ATM switch according to claim 1, comprising a plurality of said second filter means and a plurality of said second memory means; wherein each of said plurality of selecting means is connected to said plurality of second memory means, and selects one of said plurality of second memory means and said first memory means corresponding to the OUT line.

5. An ATM switch for selectively outputting a plurality of cells input through a plurality of IN lines and each having individual destination information, to a plurality of OUT lines in accordance with the destination information of each cell, comprising:

multiplying and outputting means for time-divisionally multiplying and outputting the plurality of cells input through said plurality of IN lines;

a plurality of first filter means, each being provided corresponding to each of said plurality of OUT lines, for fetching a cell having a corresponding OUT line as destination information, from the cells output from said multiplying and outputting means;

second filter means for fetching a cell having the set destination information, from the cells output from said multiplying and outputting means, said second filter means being variable in accordance with the destination information;

first memory means for writing the cell fetched by said second filter means and for reading the written cell;

a plurality of selecting means, each being provided corresponding to each of said plurality of OUT lines, each receiving a cell fetched by said first filter means corresponding to the OUT line and a cell read from said first memory means, for selectively outputting either of the cells;

a plurality of second memory means, each being provided corresponding to each of said plurality of OUT lines, each writing a cell output from the corresponding said selecting means and reading the written cell to the corresponding OUT line;

filter control means for controlling set destination information of the cell to be fetched in said second filter means, in accordance with state of use of each of said plurality of second memory means; and selection control means for controlling state of selection of each of said selecting means in accordance with the state of use of each of said plurality of second memory means.

6. The ATM switch according to claim 5, wherein each of said first memory means and said plurality of second memory means is an FIFO memory.

7. The ATM switch according to claim 5, comprising a plurality of said second filter means and a plurality of said first memory means; wherein each of said plurality of selecting means is connected to one of said plurality of said first memory means, said connected first memory means being an object of selection.

8. An ATM switch for selectively outputting a plurality of cells input through a plurality of IN lines and each having individual destination information, to a plurality of OUT lines in accordance with destination information of each cell, comprising:

multiplying and outputting means for time-divisionally multiplying and outputting a plurality of cells input through said plurality of IN lines;

a plurality of filter means larger in number than said OUT lines, each being variable in accordance with the destination information, for fetching a cell having the set destination information from the cells output from said multiplying and outputting means;

a plurality of memory means, each being provided corresponding to each of said plurality of filter means, each writing the cell fetched by the corresponding filter means and reading the written cells;

filter control means for controlling set destination information of the cell to be fetched in each of said plurality of filter means, in accordance with state of use of each of said plurality of memory means;

selecting means for selecting part of said plurality of memory means for providing a cell read from the selected memory means to an OUT line corresponding to the destination information set in the filter means corresponding to the selected memory means; and selection control means for controlling state of selection of said selecting means in accordance with the state of use of each of said plurality of memory means.

9. The ATM switch according to claim 8, wherein each of said plurality of memory means is an FIFO memory.

10. The ATM switch according to claim 8, wherein said selecting means includes a plurality of selecting and outputting means provided corresponding to said plurality of OUT lines, each receiving a cell read from said plurality of memory means for selectively outputting the received cell to a corresponding OUT line in accordance with control by said selection control means.

11. An ATM switch for selectively outputting a plurality of cells input through a plurality of IN lines and each having individual destination information, to a plurality of OUT lines in accordance with destination information of each cell, comprising:

multiplying and outputting means for time-divisionally multiplying and outputting the plurality of cells input through said plurality of IN lines;

memory means for writing a cell output from said multiplying and outputting means and for reading the written cells;

selecting and outputting means for outputting the cell read from said memory means to an OUT line corresponding to the destination information of that cell;

a plurality of first address storing means, each being provided corresponding to each of said plurality of OUT lines, each storing address of said memory means in which a cell having destination information of the corresponding OUT line written therein, for reading the stored address;

second address storing means capable of changing setting of the corresponding OUT line, storing the address of said memory means in which a cell having destination information of the corresponding OUT line is written, for reading the stored address;

destination information extracting means for extracting destination information of the cells input from said plurality of IN lines;

corresponding OUT line control means for controlling set state of the OUT line to which said second address storing means corresponds, in accordance with state of use of each of said plurality of first address storing means; and memory control means for controlling operation of said memory means to provide writing of the input cell, an address of said memory means to which said input cell is written is stored in said first or second address storing means corresponding to the destination information of the cell extracted by said destination information extracting means, and the address stored in said first or second address storing means is read so as to read the cell stored in the address of said memory means.

12. The ATM switch according to claim 11, wherein each of said plurality of first address storing means and said second address storing means is an FIFO memory.

13. The ATM switch according to claim 11, wherein when any of said plurality of first address storing means becomes full, said memory control means controls the operation such that instead of the first address storing means which becomes full, an address to be stored in said first address storing means which is full is stored in said second address storing means.

14. The ATM switch according to claim 13, further comprising:

a write data bus to which an address to be selectively written to said plurality of first address storing means and said second address storing means is transmitted;

a read data bus to which an address selectively read from said plurality of first address storing means and said second address storing means is transmitted;

address output selecting means controlled by said memory control means, for selectively effecting an operation for providing an address selectively read from said plurality of first address storing means and transmitted to said read data bus as an address for reading a cell stored in said memory means, and an operation for providing an address read from said second address storing means and transmitted to said read data bus to be stored in said first address storing means which has become full;

register means for storing an address read from said second address storing means and supplied from said address output selecting means and for reading the stored address; and address input selecting means controlled by said memory control means, for selectively effecting an operation for transmitting an address to be selectively stored in said plurality of first address storing means and said second address storing means to said write data bus, and an operation for transmitting an address read from said register means to said write data bus.

15. The ATM switch according to claim 13, further comprising:

a write data bus to which an address selectively written to said plurality of first address storing means and said second address storing means is transmitted;

a read data bus to which an address selectively read from said plurality of first address storing means is transmitted;

register means for storing the address read from said second address storing means and for reading the stored address; and a plurality of address input selecting means, each being provided corresponding to each of said plurality of first address storing means, each controlled by said memory control means, for selectively performing an operation for transmitting an address to be selectively stored in said plurality of first address storing means from said write data bus to the corresponding first address storing means, and an operation of transmitting the address read from said register means to the corresponding first address storing means.

16. The ATM switch according to claim 13, further comprising:

a write data bus to which an address to be selectively written to said plurality of first address storing means and said second address storing means is transmitted;

register means for storing an address read from said second address storing means and for reading the stored address; and address input selecting means controlled by said memory control means for selectively effecting an operation of transmitting an address to be selectively stored in said plurality of first address storing means and said second address storing means to said write data bus, and an operation of transmitting the address read from said register means to said write data bus.

17. The ATM switch according to claim 13, further comprising:

a write data bus to which an address to be selectively written to said plurality of first address storing means and said second address storing means is transmitted;

register means storing an address read from said second address storing means and reading the stored address; and a plurality of address input selecting means each being provided corresponding to each of said plurality of first address storing means, each controlled by said memory control means, for selectively effecting an operation of transmitting an address to be selectively stored in said plurality of first address storing means from said write data bus to a corresponding first address storing means, and an operation of transmitting an address read from said register means to the corresponding first address storing means.

18. An ATM switch for selectively outputting a plurality of cells input from a plurality of IN lines and each having individual destination information, to a plurality of OUT lines in accordance with the destination information of each cell, comprising:

multiplying and outputting means for time-divisionally multiplying and outputting a plurality of cells input through said plurality of IN lines;

memory means for writing a cell output from said multiplying and outputting means and for reading the written cells;

selecting and outputting means for outputting a cell read from said memory means to said OUT line corresponding to the destination information of that cell;

address storing means for storing an address of said memory means to which said cell is written, and a pointer set for indicating a location of a next cell having the same destination information as said written cell, for forming a plurality of pointer chains corresponding to each of said plurality of OUT lines by means of said pointer;

destination information extracting means for extracting destination information of cells input from said plurality of IN lines; and memory control means for controlling an operation such that an input cell is written to an empty address of said memory means, address of the written cell is stored in said address storing means so as to form said pointer chain corresponding to destination information of the cell extracted by said destination information extracting means, and address of each of said pointer chain is read from said address storing means so as to read the cell stored in the address of said memory means.

* * * * *